United States Patent
Creek et al.

(10) Patent No.: US 12,499,206 B2
(45) Date of Patent: *Dec. 16, 2025

(54) SPLIT KEY ARCHITECTURE FOR FACILITATING AUTHENTICATION BETWEEN AN IMPLANTED MEDICAL DEVICE AND AN EXTERNAL DEVICE

(71) Applicant: Advanced Neuromodulation Systems, Inc., Plano, TX (US)

(72) Inventors: Greg Creek, Prosper, TX (US); Scott DeBates, Frisco, TX (US)

(73) Assignee: Advanced Neuromodulation Systems, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,504

(22) Filed: Apr. 29, 2024

(65) Prior Publication Data

US 2024/0281517 A1    Aug. 22, 2024

Related U.S. Application Data

(63) Continuation of application No. 17/527,943, filed on Nov. 16, 2021, now Pat. No. 12,008,098.
(Continued)

(51) Int. Cl.
*G06F 21/44* (2013.01)
*H04L 9/32* (2006.01)

(52) U.S. Cl.
CPC .......... *G06F 21/445* (2013.01); *H04L 9/3263* (2013.01); *H04L 9/3273* (2013.01)

(58) Field of Classification Search
CPC .................................................. G06F 21/445
See application file for complete search history.

(56) References Cited

U.S. PATENT DOCUMENTS

| | | |
|---|---|---|
| 5,987,519 A | 11/1999 | Peifer et al. |
| 6,085,333 A | 7/2000 | DeKoning et al. |

(Continued)

FOREIGN PATENT DOCUMENTS

| | | |
|---|---|---|
| EP | 3091459 A1 | 11/2016 |
| EP | 3466484 A1 | 4/2019 |

(Continued)

OTHER PUBLICATIONS

Chan et al., "On the Distribution and Revocation of Cryptographic Keys in Sensor Networks," IEEE Transactions on Dependable and Secure Computer, vol. 2, issue 3, Jul.-Sep. 2005, pp. 233-247, 2005.
(Continued)

*Primary Examiner* — John B King
*Assistant Examiner* — Alex D Carrasquillo
(74) *Attorney, Agent, or Firm* — Norton Rose Fulbright US LLP

(57) ABSTRACT

A system and method for facilitating device and application authentication between an external device and an implanted medical device (IMD), wherein a therapy application executing on the external device is operative to communicate with the IMD via wireless telemetry communications. A device authentication parameter may be decomposed into two key components, wherein one component may be stored in a cloud key vault and the other component may be distributed to the external device as an obfuscated portion embedded in the therapy application. Upon receiving the therapy application, the external device is operative to separately retrieve both key components and reconstitute the original authentication parameter therefrom, which may be presented to the IMD for authentication.

19 Claims, 13 Drawing Sheets

Related U.S. Application Data

(60) Provisional application No. 63/131,139, filed on Dec. 28, 2020.

(56) References Cited

U.S. PATENT DOCUMENTS

| | | | |
|---|---|---|---|
| 6,622,050 | B2 | 9/2003 | Thompson |
| 6,880,085 | B1 | 4/2005 | Balczewski et al. |
| 7,027,872 | B2 | 4/2006 | Thompson |
| 7,039,810 | B1 | 5/2006 | Nichols |
| 7,155,290 | B2 | 12/2006 | Von Arx et al. |
| 7,228,179 | B2 | 6/2007 | Campen et al. |
| 7,228,182 | B2 | 6/2007 | Healy et al. |
| 7,369,897 | B2 | 5/2008 | Boveja |
| 7,475,245 | B1 | 1/2009 | Healy et al. |
| 7,664,553 | B2 | 2/2010 | Roberts |
| 7,801,611 | B2 | 9/2010 | Persen et al. |
| 7,818,067 | B2 | 10/2010 | Healy et al. |
| 7,831,828 | B2 | 11/2010 | Von Arx et al. |
| 7,890,180 | B2 | 2/2011 | Quiles |
| 7,930,543 | B2 | 4/2011 | Corndorf |
| 7,940,933 | B2 | 5/2011 | Corndorf |
| 8,102,999 | B2 | 1/2012 | Corndorf |
| 8,218,445 | B2 | 7/2012 | Katz et al. |
| 8,331,563 | B2 | 12/2012 | Healy et al. |
| 8,332,041 | B2 | 12/2012 | Skelton et al. |
| 8,568,356 | B2 | 10/2013 | Lebel et al. |
| 8,649,757 | B2 | 2/2014 | Roberts et al. |
| 8,682,437 | B2 | 3/2014 | Kalpin et al. |
| 8,922,330 | B2 | 12/2014 | Moberg et al. |
| 9,215,075 | B1 | 12/2015 | Poltorak |
| 9,288,614 | B1 | 3/2016 | Young et al. |
| 9,348,974 | B2 | 5/2016 | Goetz |
| 9,401,894 | B2 | 7/2016 | Kalpin et al. |
| 9,445,264 | B2 | 9/2016 | Young et al. |
| 9,446,252 | B2 | 9/2016 | Benson |
| 9,649,049 | B2 | 5/2017 | Pless et al. |
| 9,722,803 | B1 | 8/2017 | Ellingson et al. |
| 9,773,060 | B2 | 9/2017 | Gerst et al. |
| 9,855,433 | B2 | 1/2018 | Shahandeh et al. |
| 9,893,961 | B2 | 2/2018 | Keith, Jr. |
| 9,906,360 | B2 * | 2/2018 | Johnson ............... H04L 9/0631 |
| 9,942,051 | B1 | 4/2018 | Poltorak |
| 9,974,108 | B2 | 5/2018 | Polefko |
| 10,086,202 | B2 | 10/2018 | Seim et al. |
| 10,117,580 | B1 | 11/2018 | Puryear |
| 10,124,177 | B2 | 11/2018 | Kumar |
| 10,147,502 | B2 | 12/2018 | Paffel et al. |
| 10,306,472 | B2 | 5/2019 | Battiwalla et al. |
| 10,493,287 | B2 | 12/2019 | Yoder et al. |
| 10,511,436 | B1 * | 12/2019 | Machani ............... H04L 9/085 |
| 10,516,527 | B1 | 12/2019 | Machani |
| 10,554,632 | B2 | 2/2020 | Lange |
| 10,576,290 | B2 | 3/2020 | Schilling et al. |
| 10,599,814 | B2 | 3/2020 | Landrum et al. |
| 11,007,370 | B2 | 5/2021 | Shahandeh et al. |
| 11,364,386 | B2 | 6/2022 | Ibarrola |
| 2002/0015401 | A1 | 2/2002 | Subramanian et al. |
| 2002/0072785 | A1 | 6/2002 | Nelson et al. |
| 2002/0082665 | A1 | 6/2002 | Haller et al. |
| 2003/0083719 | A1 | 5/2003 | Shankar et al. |
| 2003/0088295 | A1 | 5/2003 | Cox |
| 2003/0093127 | A1 | 5/2003 | Dalal |
| 2004/0117206 | A1 | 6/2004 | Steinberger et al. |
| 2004/0167587 | A1 | 8/2004 | Thompson |
| 2005/0033369 | A1 | 2/2005 | Badelt |
| 2005/0203582 | A1 | 9/2005 | Healy et al. |
| 2005/0261934 | A1 | 11/2005 | Thompson |
| 2005/0283210 | A1 | 12/2005 | Blischak et al. |
| 2005/0288736 | A1 | 12/2005 | Persen et al. |
| 2006/0030904 | A1 | 2/2006 | Quiles |
| 2006/0189854 | A1 | 8/2006 | Webb et al. |
| 2006/0265022 | A1 | 11/2006 | John et al. |
| 2007/0016257 | A1 | 1/2007 | Brown et al. |
| 2007/0038867 | A1 * | 2/2007 | Verbauwhede ....... H04L 9/3231 713/186 |
| 2007/0136098 | A1 | 6/2007 | Smythe et al. |
| 2007/0150013 | A1 | 6/2007 | Ding et al. |
| 2008/0140163 | A1 | 6/2008 | Keacher et al. |
| 2008/0163361 | A1 | 7/2008 | Davis et al. |
| 2008/0215119 | A1 | 9/2008 | Woods et al. |
| 2008/0288029 | A1 | 11/2008 | Healy et al. |
| 2009/0048644 | A1 | 2/2009 | Stahmann et al. |
| 2009/0069867 | A1 | 3/2009 | Kenknight et al. |
| 2009/0281598 | A1 | 11/2009 | Haubrich et al. |
| 2009/0326608 | A1 | 12/2009 | Huynh et al. |
| 2010/0010572 | A1 | 1/2010 | Skelton et al. |
| 2010/0066500 | A1 | 3/2010 | Ljungstrom et al. |
| 2010/0211135 | A1 | 8/2010 | Caparso |
| 2011/0009916 | A1 | 1/2011 | Efimov et al. |
| 2011/0145588 | A1 | 6/2011 | Stubbs et al. |
| 2011/0171905 | A1 | 7/2011 | Roberts et al. |
| 2011/0172740 | A1 | 7/2011 | Matos |
| 2012/0197347 | A1 | 8/2012 | Olson et al. |
| 2013/0154851 | A1 | 6/2013 | Gaskill et al. |
| 2013/0185783 | A1 * | 7/2013 | Jelatis ..................... G16Z 99/00 726/7 |
| 2013/0218582 | A1 | 8/2013 | Lalonde |
| 2013/0246084 | A1 | 9/2013 | Parmanto et al. |
| 2014/0055230 | A1 | 2/2014 | Hoyme et al. |
| 2014/0122120 | A1 | 5/2014 | Doudian |
| 2014/0185805 | A1 | 7/2014 | Andersen |
| 2014/0244305 | A1 | 8/2014 | Schoenberg |
| 2014/0273824 | A1 | 9/2014 | Fenner et al. |
| 2015/0032633 | A1 | 1/2015 | Haider et al. |
| 2015/0033365 | A1 | 1/2015 | Mellor et al. |
| 2015/0089590 | A1 | 3/2015 | Krishnan et al. |
| 2015/0117645 | A1 | 4/2015 | Carlson et al. |
| 2015/0149787 | A1 * | 5/2015 | Panchapakesan ..... H04L 63/083 713/184 |
| 2015/0281285 | A1 | 10/2015 | Bharali et al. |
| 2015/0321003 | A1 | 11/2015 | Pless et al. |
| 2015/0343229 | A1 | 12/2015 | Peterson et al. |
| 2015/0358583 | A1 | 12/2015 | Lee et al. |
| 2016/0330573 | A1 | 11/2016 | Masoud et al. |
| 2016/0342762 | A1 | 11/2016 | Goetz |
| 2017/0032092 | A1 | 2/2017 | Mink et al. |
| 2017/0111488 | A1 | 4/2017 | Mazar et al. |
| 2017/0203111 | A1 * | 7/2017 | Pless .................. A61N 1/36135 |
| 2017/0259072 | A1 | 9/2017 | Newham et al. |
| 2017/0296076 | A1 | 10/2017 | Mahajan et al. |
| 2017/0304636 | A1 | 10/2017 | Steinke et al. |
| 2017/0325091 | A1 | 11/2017 | Freeman |
| 2018/0028827 | A1 | 2/2018 | Schilling et al. |
| 2018/0110475 | A1 | 4/2018 | Shaya |
| 2018/0241564 | A1 | 8/2018 | Peterson |
| 2018/0243573 | A1 | 8/2018 | Yoder |
| 2018/0309766 | A1 | 10/2018 | Marnfeldt |
| 2018/0325463 | A1 | 11/2018 | Walsh |
| 2018/0361153 | A1 | 12/2018 | Heldman et al. |
| 2019/0182617 | A1 | 6/2019 | Zamber |
| 2019/0365228 | A1 | 12/2019 | Rondini |
| 2020/0086128 | A1 | 3/2020 | Rondini |
| 2020/0228349 | A1 | 7/2020 | Basu |
| 2020/0398063 | A1 | 12/2020 | DeBates et al. |
| 2020/0402656 | A1 | 12/2020 | DeBates et al. |
| 2020/0402674 | A1 | 12/2020 | DeBates et al. |
| 2021/0058257 | A1 * | 2/2021 | Pepin ..................... H04L 9/3247 |
| 2021/0367721 | A1 | 11/2021 | Saravanan |
| 2022/0337403 | A1 | 10/2022 | Nagai |
| 2023/0201607 | A1 * | 6/2023 | Nin ........................ G06F 21/44 607/60 |

FOREIGN PATENT DOCUMENTS

| | | |
|---|---|---|
| WO | WO-0193953 A1 | 12/2001 |
| WO | WO-2017165717 A1 | 9/2017 |
| WO | WO-2019032788 A1 | 2/2019 |

OTHER PUBLICATIONS

Epstein, M. A. et al. "Security for the Digital Information Age of Medicine: Issues, Applications, and Implementation," Journal of Digital Imaging, vol. 11, No. 1, Feb. 1998, 12 pages.

(56) References Cited

OTHER PUBLICATIONS

European Patent Office, Communication, Extended European Search Report for Patent Application No. 19878741.8, dated Jun. 22, 2022, 6 pages.
European Patent Office, Communication, Extended European Search Report for Patent Application No. 19879674.0, dated Jul. 1, 2022, 6 pages.
European Patent Office, Communication, Extended European Search Report for Patent Application No. 19880173.0, dated Jun. 22, 2022, 7 pages.
European Patent Office, Communication, Extended European Search Report for Patent Application No. 19880409.8, dated Jun. 22, 2022, 7 pages.
Halperin, Daniel, et al. "Security and Privacy for Implantable Medical Devices," IEEE Pervasive Computing vol. 7, No. 1 (2008): 30-39. 11 pages.
International Search Report for PCT/US2019/59485; dated Feb. 3, 2020; 8 pgs.
International Search Report for PCT/US2019/59489; dated Feb. 4, 2020; 9 pgs.
International Search Report for PCT/US2019/59497; dated Feb. 4, 2020; 9 pgs.
International Search Report for PCT/US2019/59501; dated Feb. 4, 2020; 14 pgs.
International Search Report for PCT/US2019/59507; dated Feb. 6, 2020; 8 pgs.
NPL Search Terms—reconciling software configuration changes, reconciling software configuration changes medical devices (Year: 2023); 1 page.
NPL Search Terms—implantable medical device security key, reconciling configuration changes medical devices (Year: 2023); 1 page.
Park, Chang-Seop, "Security Mechanism Based on Hospital Authentication Server for Secure Application of Implantable Medical Devices," BioMed Research International, vol. 2014, Hindawi Publishing Corporation, Jul. 2014, 12 pages.
Xu, F. et al. "IMDGuard: Securing Implantable Medical Devices With the External Wearable Guardian," 2011 Proceedings IEEE INFOCOM, Shanghai, China, Apr. 10-15, 2011, 9 pages.
USPTO, Notice of Allowance, U.S. Appl. No. 16/901,368, May 13, 2021, 5 pgs.
International Search Report for PCT/US2020/034519; dated Sep. 21, 2020; 16 pgs.
International Search Report for PCT/US2020/037180; dated Sep. 4, 2020; 11 pgs.
International Search Report for PCT/US2020/038165; dated Sep. 11, 2020; 25 pgs.
International Search Report for PCT/US2020/038434; dated Sep. 10, 2020; 20 pgs.
Kim et al., Self-Organizing Peer-to-Peer Middleware for Healthcare Monitoring in Real-time, Sensors, Nov. 17, 2017, pp. 1-19, MDPI.
Ricci et al., Home Monitoring Remote Control of Pacemaker and Implantable Cardioverter Defibrillator Patients in Clinical Practice: Impact on medical Management and Heal-Care Resource Ultization, Europace, Jan. 16, 2008, 7 pgs, European Society of Cardiology.
Sundaravadivel et al., "Everything You Wanted to Know About Smart Health Care," IEEE Consumer Electronics Magazine, Dec. 13, 2017, pp. 18-28, IEEE Consumer Technology Society.
Vegesna et al., "Remote Patient Monitoring via Non-Invasive Digital Technolgies: A Systematic Review," Telemedicine and e-Health, Jan. 2017, pp. 3-17, Mary Ann Liebert, Inc.
Wazid et al., "A Novel Authentication and Key Agreement Scheme for Implantable Medical Devices Deployment," IEEE Journal of Biomedical and Health Informatics, vol. 22, No. 4, pp. 1299-1309, 2018.
Gordon, "Simple Introduction to Using OpenSSI on Command Line," 2013, http://sandilands.info/simple-introduction-to-using-openssi-on-command-line, 2013.

* cited by examiner

SPLIT KEY ARCHITECTURE FOR FACILITATING AUTHENTICATION BETWEEN AN IMPLANTED MEDICAL DEVICE AND AN EXTERNAL DEVICE

PRIORITY AND CROSS-REFERENCE TO RELATED APPLICATION(S)

The present application is a continuation of U.S. patent application Ser. No. 17/527,943 filed Nov. 16, 2021 and entitled "SPLIT KEY ARCHITECTURE FOR FACILITATING AUTHENTICATION BETWEEN AN IMPLANTED MEDICAL DEVICE AND AN EXTERNAL DEVICE," which claims priority based upon U.S. Provisional Application No. 63/131,139, filed Dec. 28, 2020 and entitled "SYSTEMS AND METHODS FOR PROVIDING AUTHENTICATED ACCESS BETWEEN AN IMPLANTED MEDICAL DEVICE AND AN EXTERNAL DEVICE," the disclosures of which are hereby incorporated by reference herein in their entirety.

TECHNICAL FIELD

This application is generally related to securing communication between an implanted medical device and an external device and, in some embodiments, to authenticating and securing programming of an implanted medical device.

BACKGROUND

Implantable medical devices (IMDs) have changed how medical care is provided to patients having a variety of chronic illnesses and disorders. For example, implantable cardiac devices improve cardiac function in patients with heart disease by improving quality of life and reducing mortality rates. Respective types of implantable neurostimulators provide a reduction in pain for chronic pain patients and reduce motor difficulties in patients with Parkinson's disease and other movement disorders. A variety of other medical devices are proposed and are in development to treat other disorders in a wide range of patients.

IMDs are programmed by and transmit data to external devices controlled by physicians, the patient, and/or their respective agents. The external devices communicate by forming wireless bi-directional communication links with the IMDs. For example, an external device of the patient (e.g., patient's programmer) may only be configured to form a wireless bi-directional communication link with the IMD implanted in the patient. However, the external device of the clinician (e.g., doctor, nurse) may be configured to form wireless bi-directional communication links with multiple IMDs.

Recently, there has been a growing trend for the external devices to communicate using Bluetooth, WiFi, or other commercial protocols compatible with commercial wireless devices such as tablet computers, smartphones, and the like (commonly referred to as commercial off-the-shelf (COTS) equipment). However, commercial protocols have limited pairing procedures for establishing secure communication links. Further, commercial protocols may require a user interface for each device to, for example, provide security keys or passkeys to establish the secured connection. Moreover, commercial protocols running on COTS devices (e.g., machine-to-machine (M2M) protocols) used for therapy applications may also be accessed by a myriad of other applications or programs also hosted by the COTS devices for other purposes, thereby engendering a potential security issue with respect to the device's communications with the IMD.

SUMMARY

Example embodiments of the present patent disclosure are directed to systems, methods and associated computer-readable media for effectuating authentication between an external device and an IMD using a split key architecture, wherein an authenticated device with a therapy application executing thereon is operative to communicate with the IMD via wireless telemetry communications.

In one aspect, an embodiment of a method of facilitating authentication between an external device and an IMD of a patient is disclosed. The claimed embodiment may involve, inter alia, generating a device authentication parameter comprising a binary value having a predetermined key strength and decomposing the device authentication parameter into a first key component and a second key component, e.g., using a key split operation. In one arrangement, the first key component may be provided to a cloud storage system, e.g., using OpenSSL. In one arrangement, the second key component may be embedded, e.g., using key obfuscation techniques, into a therapy application executable on the external device, wherein the therapy application may be distributed or provided using via at least one of a public app store, a private app store, a File Transfer Protocol (FTP) site, an enterprise device management system, a push mechanism and/or a pull mechanism. Upon receipt and subsequent execution of the therapy application, the external device is operative to obtain the first key component from the cloud storage system responsive to an authenticated application programming interface (API) call over a Transport Layer Security (TLS) session. The second key component may be retrieved using de-obfuscation logic that may be instrumented in the therapy application or provided via a separate channel. Using the first and second key components, the therapy application is operative to generate a reconstituted device authentication parameter, e.g., based on an inverse key split operation, to be presented to the IMD for authentication therewith. Because the key components held in the cloud and the therapy application must be disclosed independently and a threat actor must be able to reconstitute the complete authentication parameter, it should be appreciated that the split key techniques herein advantageously mitigate the risk of disclosure and potential breach of device security.

In one arrangement, the authentication parameter may comprise a binary value of having a key strength and/or key length, e.g., 128 bits, 256 bits, etc. In one example implementation, the first key component may comprise a random 128-bit value generated using OpenSSL, wherein the second key component comprises a value obtained by executing a reversible logic operation combining the random 128-bit value and the binary value. In one example implementation, the reversible logic operation between the random 128-bit value and the binary value may comprise a bitwise exclusive-OR (XOR) operation. In one example implementation, the second key component may be embedded into the therapy application via encoding in a non-descript string obfuscation process. In a further arrangement, an example method may comprise storing the reconstituted device authentication parameter in a device keychain of the external device and accessing the reconstituted device authentication parameter on each attempt by the external device to establish connection with the IMD. Depending on a deployment scenario, the external device may be a patient controller, a clinician programmer, or a delegated agent device, any of which may be provided as a COTS device or a non-COTS device.

In another aspect, an external device operative to communicate with an IMD of a patient using an authentication overlay layer of wireless telemetry communications is disclosed. An embodiment of the external device comprises, inter alia, one or more processors; communication circuitry operative to effectuate a wireless telemetry communication link with the IMD; and a persistent memory module including a therapy application having program instructions configured to perform following acts when executed by the one or more processors: obtain a first key component from a cloud storage system; retrieve a second key component embedded in the therapy application; and generate a reconstituted device authentication parameter from the first and second key components to be presented to the IMD for authentication therewith.

In still further aspects, one or more embodiments of a non-transitory computer-readable medium or distributed media containing computer-executable program instructions or code portions stored thereon are disclosed for performing example methods herein when executed by a processor entity of a patient controller device, a clinician programmer device, a delegated agent device, an IMD, etc. that may be modified appropriately, mutatis mutandis.

Additional/alternative features and variations of the embodiments as well as the advantages thereof will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effectuate such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION

Figure 1:
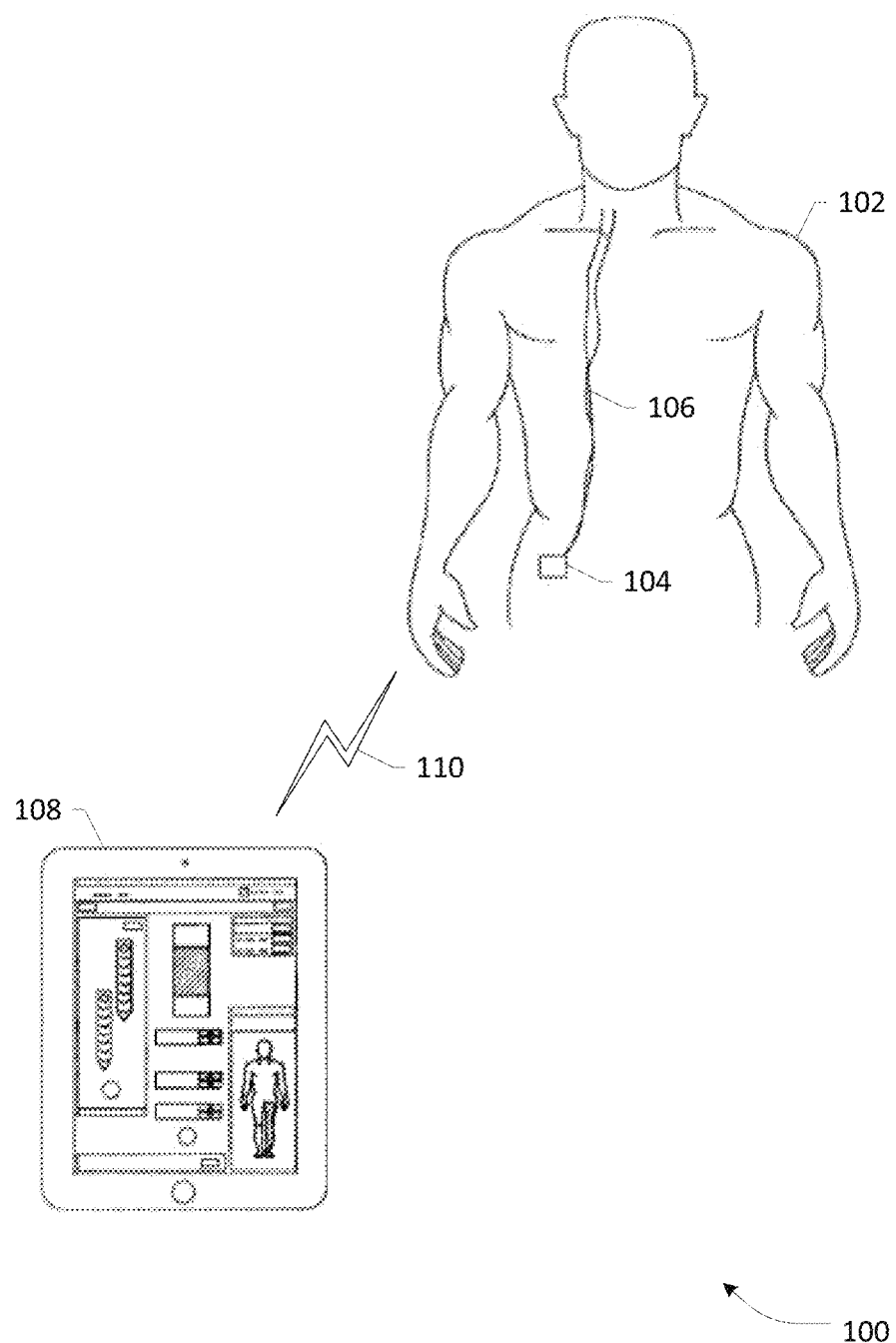
FIG. 1 depicts an example therapy system wherein device and/or application authentication between an external device (ED) and an implanted medical device (IMD) of a patient may be effectuated according to one or more embodiments of the present patent disclosure.

In the description herein for embodiments of the present disclosure, numerous specific details are provided, such as examples of circuits, devices, components and/or methods, to provide a thorough understanding of embodiments of the present disclosure. One skilled in the relevant art will recognize, however, that an embodiment of the disclosure can be practiced without one or more of the specific details, or with other apparatuses, systems, assemblies, methods, components, materials, parts, and/or the like set forth in reference to other embodiments herein. In other instances, well-known structures, materials, or operations are not specifically shown or described in detail to avoid obscuring aspects of embodiments of the present disclosure. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an electrical element, component or module may be configured to perform a function if the element may be programmed for performing or otherwise structurally arranged to perform that function.

Some example embodiments described herein may relate to the establishment of a secure authenticated communication channel over a wireless telemetry communication link between an external device and an implantable pulse generator (IPG) or neuromodulator for providing therapy to a desired area of a body or tissue based on a suitable stimulation therapy application hosted by the external device, such as a spinal cord stimulation (SCS) system or other neuromodulation systems. However, it should be understood that example embodiments disclosed herein are not limited thereto, but have broad applicability, including but not limited to a variety of therapy applications involving different types of implantable devices such as neuromuscular stimulators and sensors, dorsal root ganglion (DRG) stimulators, deep brain stimulators, cochlear stimulators, retinal implanters, muscle stimulators, tissue stimulators, cardiac stimulators or pacemakers, gastric stimulators, and the like, as well as implantable drug delivery/infusion systems, implantable devices configured to effectuate real-time measurement/monitoring of one or more physiological functions of a patient's body (i.e., patient physiometry), including various implantable biomedical sensors and sensing systems. Further, whereas some example embodiments of therapy applications may involve implantable devices, additional and/or alternative embodiments may involve external personal devices, e.g., wearable biomedical devices, that may be configured to provide therapy to the patients analogous to the implantable devices. Accordingly, all such devices may be broadly referred to as "personal medical devices," "personal biomedical instrumentation," or terms of similar import, at least for purposes of some example embodiments of the present disclosure. Still further, the teachings of the present patent disclosure may also be practiced in a more generalized context involving various types of wireless telemetry and/or M2M communications between a first device and a second device effectuated via a standard or proprietary communication protocol stack that may be commonly accessible to a plurality of applications hosted by the first device, wherein not only confidentiality and integrity of data transmission but also application authentication is desired regardless of—or beyond—any security layer(s) provided with the communication protocol stack, e.g., to ensure that only the intended or correct application or software program executing on the first device is communicating with the second device.

Referring to FIG. 1, depicted therein is an example therapy system wherein device and/or application authentication between an external device (ED) and an implanted medical device (IMD) of a patient may be effectuated according to one or more embodiments of the present patent disclosure. Example therapy system 100 is illustrative of a patient 102 having an implantable medical device (IMD) 104 and an external device 108 that may be controlled by the patient 102 and/or an authorized healthcare provider, e.g., a medical professional or technician, and/or an authorized agent respectively thereof having appropriate level(s) of privilege authorization, to administer different aspects relative to providing therapy to the patient 102 by communicating with IMD 104. External device 108 may comprise commercial off-the-shelf (COTS) equipment such as a portable computer, smartphone, tablet, phablet, laptop, or the like, or a proprietary portable medical/healthcare device, which may be configured to execute a therapy application program or "app", wherein various types of communications relating to control, therapy/diagnostics, and/or device file management may be effectuated between one or more modules of external device 108 and IMD 104 for administering therapy and/or monitoring patient health data. Example IMD 104 may be implanted within the patient 102, e.g., proximate to the spinal cord or other tissue or organ depending on the therapy, wherein one or more leads 106 having one or more electrodes and/or sensors (not specifically shown in this FIG.) may be activated to provide therapy and/or obtain sense information. Additionally or alternatively, IMD 104 may have components that are external to the patient 102; for example, IMD 104 may be associated with an external pulse generator (EPG) or other non-invasive PMD that may also be configured to provide therapy and/or obtain therapy data.

In one arrangement, external device 108 may be configured to establish a local wireless telemetry communication link, e.g., a bi-directional communication link 110, with IMD 104 for facilitating a therapy application executing on external device 108 to, inter alia, receive various pieces of information, e.g., therapy measurements, sensory data, personal data, logging data, etc., from IMD 104, and to program or send instructions to IMD 104, using a standard or proprietary communication protocol stack on the external device that may also be commonly accessible to (or susceptible to access by) one or more other applications or software programs either legitimately hosted by the external device or maliciously implanted therein by unscrupulous actors. In one arrangement, the bi-directional communication link 110 may be effectuated via a wireless personal area network (WPAN) using a standard wireless protocol such as Bluetooth Low Energy (BLE), Bluetooth, Wireless USB, Zigbee, Near-Field Communications (NFC), WiFi, Infrared Wireless, and the like. In some arrangements, communication link 110 may also be established using magnetic induction techniques rather than radio waves, e.g., via an induction wireless mechanism. Alternatively and/or additionally, communication link 110 may be effectuated in accordance with certain healthcare-specific communications services including, Medical Implant Communication Service (MICS), Wireless Medical Telemetry Service (WMTS), Medical Device Radiocommunications Service (MDRS), Medical Data Service (MDS), etc. Accordingly, regardless of which type(s) of communication technology being used, external device 108 and IMD 104 may each be provided with appropriate hardware, software and firmware (e.g., forming suitable communication circuitry including transceiver circuitry and antenna circuitry where necessary) for effectuating communication link 110, along with corresponding protocol stacks executing on respective device platforms. In some implementations, therefore, wireless telemetry communications between external device 108 and IMD 104 may be effectuated as M2M communications based on appropriate protocols. Furthermore, external device 108 and IMD 104 may each be provisioned with suitable security credential information that may be used for facilitating an application-specific authentication scheme and/or a device authentication scheme as an overlay layer based on provisioning as will be set forth further below.

Figure 2:
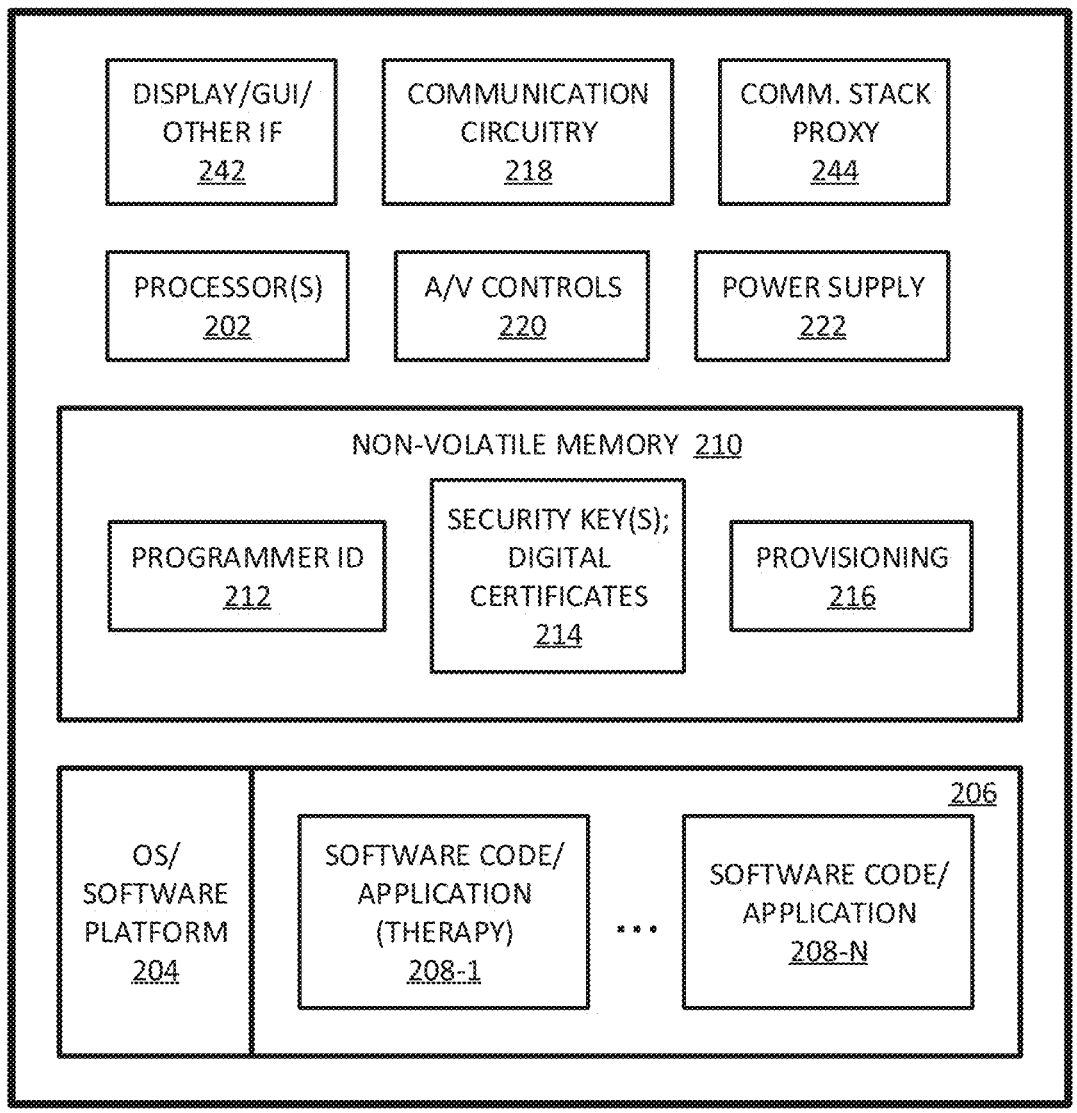
FIG. 2 depicts a block diagram of an external device according to an example embodiment of the present patent disclosure.

FIG. 2 depicts a block diagram of an external device 200 according to an example embodiment of the present patent disclosure. Depending on configuration and/or modality, external device 200 may be representative of a patient controller device, a clinician programmer device, or a delegated device operated by an agent of a patient or a clinician having subordinate levels of privilege authorization with respect to a therapy application (e.g., role setting). Further, external device 200 may be a COTS device or non-COTS device as previously noted. Still further, external device 200 may be a device that is controlled and managed in a centralized enterprise device management system (EDMS), also referred to as a mobile/medical device management system (MDMS), which may be associated with the manufacturer of the device and associated therapy application components in some embodiments (either as an intranet implementation, an extranet implementation, or internet-based cloud implementation, etc.), in order to ensure that only appropriately managed devices and users are allowed to engage in providing therapy to patients using approved therapy applications. Still further, external device 200 may be a device that is not controlled and managed in such a device management system. Accordingly, it will be realized that external device 200 may be a device that may be configured in a variety of ways depending on how its functional modality is implemented in a particular deployment. Regardless of the myriad combinations, an example embodiment of external device 200 may be treated as a "native" external device (NED) if it is controlled and managed in an authorized MDM system Otherwise, example external device 200 may be treated as an "alien" external device (AED). Depending on whether external device 200 is a native device or an alien device, different provisioning schemes may be implemented for providing appropriate security credential information with respect to a therapy application executing thereon as will be set forth further below.

Example external device 200 may include one or more processors 202, communication circuitry 218 and one or more memory modules 210, operative in association with one or more OS platforms 204 and one or more software applications 208-1 to 208-K depending on configuration, cumulatively referred to as ED software environment 206, and any other hardware/software/firmware modules, all being powered by a power supply 222, e.g., battery. Example software environment 206 and/or memory 210 may include one or more persistent memory modules comprising program code or instructions for controlling overall operations of the device, inter alia. Example OS platforms may include embedded real-time OS systems, and may be selected from, without limitation, iOS, Android, Chrome OS, Blackberry OS, Ubuntu, Sailfish OS, Windows, Kai OS, eCos, LynxOS, QNX, RTLinux, Symbian OS, VxWorks, Windows CE, MontaVista Linux, and the like. In some embodiments, at least a portion of the software applications may include code or program instructions operative as a therapy application, e.g., application 208-1, which may be configured to interoperate with program code stored in memory 210 to execute various operations relative to device registration, therapy programming, security applications, and provisioning as part of a device controller application. Further, application 208-1 may include code or program instructions configured to effectuate wireless telemetry and authentication with an IMD using a suitable communication protocol stack, e.g., stack 244, in association with a communication proxy, that may also be accessible to other applications and/or malicious code as noted previously.

Memory modules 210 may include a non-volatile storage area or module configured to store relevant patient data, therapy settings, and the like. Memory modules 210 may further include a secure storage area 212 to store a device identifier (e.g., a serial number) of device 200 used during programming sessions (e.g., local programming or remote session programming). Also, memory modules 210 may include a secure storage area 214 for storing security credential information, e.g., one or more cryptographic keys or key pairs, signed digital certificates, etc., associated with users (e.g., clinicians, patients, or respective agents), certificates of trusted entities, which may be operative in association with approved software applications, e.g., therapy application 208-1, that may be obtained during provisioning. In a further embodiment, at least a portion of the storage area 214 may be configured as a keychain area for storing a device authentication parameter that may be reconstituted based on a split key distribution/delivery/retrieval process in a split key architecture as will be set forth further below, at least which part of which may be executed as by a code portion provided as part of application 208-1 in some implementations. Communication circuitry 218 may include appropriate hardware, software and interfaces to facilitate wireless and/or wireline communications, e.g., inductive communications, wireless telemetry or M2M communications, etc. to effectuate IMD communications, as well as networked communications with cellular telephony networks, local area networks (LANs), wide area networks (WANs), packet-switched data networks, etc., based on a variety of access technologies and communication protocols. External device 200 may also include appropriate audio/video controls 220 as well as suitable display(s) (e.g., touch screen), camera(s), microphone, and other user interfaces (UIs) 242, which may be utilized for purposes of some example embodiments of the present disclosure, e.g., facilitating user input, initiating IMD communications, therapy modulation, etc.

Figure 3:
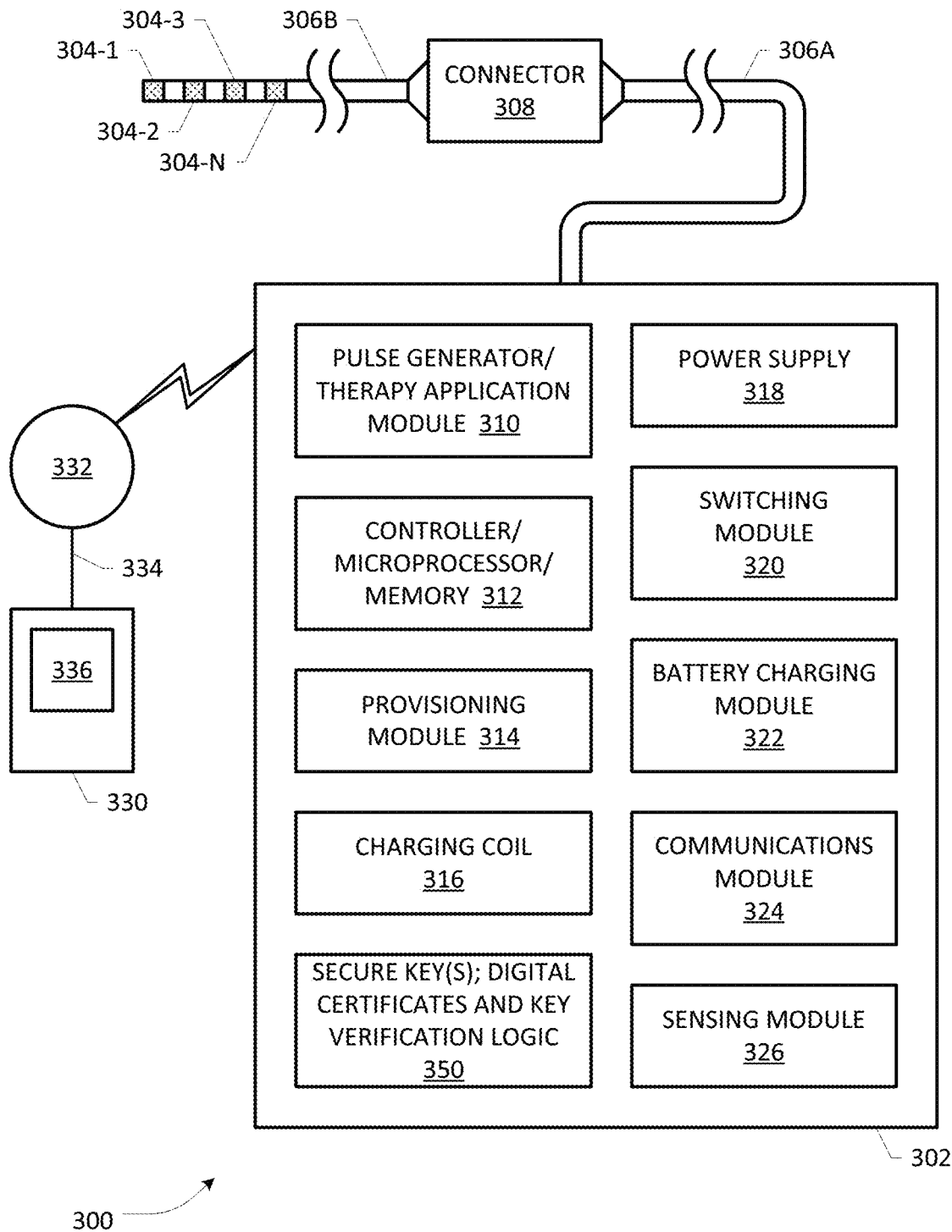
FIG. 3 depicts a block diagram of an IMD and associated system that may be configured for establishing a secure authenticated communication channel (e.g., including external device authentication and/or application program authentication) according to an example embodiment of the present patent disclosure.

FIG. 3 depicts a block diagram of an IMD and associated system that may be configured for establishing a secure authenticated communication channel according to an example embodiment of the present patent disclosure. By way of illustration, system 300 may be adapted to stimulate spinal cord tissue, peripheral nerve tissue, deep brain tissue, DRG tissue, cortical tissue, cardiac tissue, digestive tissue, pelvic floor tissue, or any other suitable biological tissue of interest within a patient's body, as previously noted. System 300 includes an IMD 302, also referred to as an embedded device in some embodiments, that is adapted to generate stimulation pulses according to known or heretofore known stimulation settings, programs, etc. In one example embodiment, IMD 302 may be implemented as having a metallic housing or can that encloses a controller/processing block and memory module 312, pulse generating circuitry with therapy application module 310, a charging coil 316, a battery or power source 318, a far-field and/or near field communication block or module 324 operative with applicable communication protocol stacks (not specifically shown), battery charging circuitry 322, switching circuitry 320, sensing circuitry 326, and the like. Controller/processor module 312 typically includes a microcontroller or other suitable processor for controlling the various other components of IMD 302. Software/firmware code may be stored in memory 312 of IMD 302, which may also be separately provided and/or integrated with other suitable application-specific storage components (not specifically shown in this FIG.) for execution by the microcontroller or processor 312 and/or other programmable logic blocks to control the various components of the device for purposes of an embodiment of the present patent disclosure.

In one arrangement, IMD 302 may be coupled to a lead system having a lead connector 308 for coupling a first component 306A emanating from IMD 302 with a second component 306B that includes a plurality of electrodes 304-1 to 304-N, which may be positioned proximate to the patient tissue. Although a single lead system 306A/306B is exemplified, it should be appreciated that an example lead system may include more than one lead, each having a respective number of electrodes for providing therapy according to configurable settings. Accordingly, an example therapy program stored in persistent memory, e.g., associated with processor circuitry 312 and/or application module 310, may include one or more lead/electrode selection settings, one or more sets of stimulation parameters corresponding to different lead/electrode combinations, respectively, such as pulse amplitude, stimulation level, pulse width, pulse frequency or inter-pulse period, pulse repetition parameter (e.g., number of times for a given pulse to be repeated for respective stimulation sets or "stimsets" during the execution of a program), etc. Additional therapy settings data may comprise electrode configuration data for delivery of electrical pulses (e.g., as cathodic nodes, anodic nodes, or configured as inactive nodes, etc.), stimulation pattern identification (e.g., tonic stimulation, burst stimulation, noise stimulation, biphasic stimulation, monophasic stimulation, and/or the like), etc. Still further, therapy programming data may be accompanied with respective metadata, which may include data that identifies the physician or clinician that created or programmed the settings data. In some embodiments, the metadata may include an identifier of the external programmer device that was used to create the settings data, the date of creation, the data of last modification, the physical location where programming occurred, and/or any other relevant data or indicia.

In some embodiments, IMD 302 may include a secure storage area 350 for storing security credential information such as, e.g., one or more cryptographic keys or key pairs, signed digital certificates, etc., associated with the device and/or approved software applications, e.g., therapy application 310, that may be obtained during provisioning. In some embodiments, a provisioning module 314 may be provided for obtaining security credential information during the manufacture of the device using the manufacturer's established root of trust system with a known public key infrastructure (PKI) system. In some embodiments, IMD 302 may be manufactured in an unprovisioned state, which may be configured to obtain security credential information via a third-party trusted entity, e.g., a medical entity, that relies on its own root of trust supplied under a PKI system. Regardless of the exact manner of provisioning as to how IMD 302 obtains security credential information, it will be seen below that the credential information may be utilized in negotiating with an external device's therapy application for establishing an authenticated communication channel therewith over a standard wireless telemetry communication link. In still further arrangements, appropriate firmware or code portion(s) may be provided as part of IMD 302, e.g., as part of application module 310 and/or provisioning module 314 and/or module 350, for verifying and authenticating example external device 330 operative to provide a device authentication parameter in some additional or alternative embodiments that will be described further below.

As noted previously, example external device 330 may be deployed for use with IMD 302 for therapy application, management and monitoring purposes, e.g., as a patient controller device or a clinician programmer device, upon establishing appropriate communication channels. Generally, external device 330 may be implemented to charge/recharge the battery 318 of IPG/IMD 302 (although a separate recharging device could alternatively be employed), to access memory 314 and/or any secure file systems thereof containing patient/program data, and/or to program or reprogram IMD 302 with respect to one or more stimulation set parameters including pulsing specifications while implanted within the patient. In alternative embodiments, however, separate programmer devices may be employed for charging and/or programming the IMD device 302 device and/or any programmable components thereof. Software stored within a non-transitory memory of the external device 330 may be executed by a processor to control the various operations of the external device 330, including executing a therapy application adapted to operate with IMD 302. Depending on the type of communication technology used, a connector or "wand" 334 may be electrically coupled to the external device 330 in some arrangements using suitable electrical connectors (not specifically shown), which may be electrically connected to a telemetry component 332 (e.g., inductor coil, RF transceiver, etc.) at the distal end of wand 334 through respective communication links that allow bi-directional communication with IMD 302. Alternatively, there may be no separate or additional external communication/telemetry components provided with example external device 330 in an example embodiment for facilitating bi-directional communications with IMD 302 (e.g., based on BLE).

In one arrangement, a user (e.g., a doctor, a medical technician, or the patient) may initiate communication with IMD 302 by placing wand 334 proximate to the patient's body containing the IMD. Preferably, the placement of the wand 334 allows the telemetry system to be aligned with the communication circuitry 324 of IMD 302. External device 330 preferably includes one or more user interfaces 336 (e.g., touch screen, keyboard, mouse, buttons, scroll wheels or rollers, or the like), allowing the user to operate IMD 302. External device 330 may be controlled by the user through interface 336, allowing the user to interact with IMD 302, whereby operations involving therapy application/programming, coordination of patient data security including encryption, etc. may be effectuated pursuant to executing a suitable therapy application that has been authenticated and upon executing a device authentication scheme according to the teachings herein.

In some arrangements, in order to ensure that only legitimate therapy applications of an external device are allowed to communicate with an IMD over a wireless telemetry protocol stack, example embodiments herein are broadly directed to an authentication scheme based on a PKI system that is mutually trusted by both the IMD and the external device/application, which provides a shared root of trust between the two endpoints of the communication link. In one arrangement, both the IMD and external device independently obtain standard digital certificates (e.g., X.509 certificates) that are cryptographically signed by a mutually-trusted certificate authority (CA) and uniquely identify the respective devices (more particularly, respective therapy applications or software code executing respectively thereon) prior to attempting to communicate directly to each other. As previously noted, the process of receiving such signed certificates may be referred to as provisioning in the context of the present patent application. It will be appreciated that the provisioning process as set forth herein includes controls to ensure that only valid IMDs and valid external devices/applications can receive such endorsement. In some embodiments, the IMD itself may be used as an authentication token when provisioning certain classes of external devices if a therapy application is available on a public digital distribution platform, e.g., an app store. After the provisioning process is complete, example embodiments ensure that the IMD is communicating with an authentic device/application based on presentation and verification of the digital certificate that is signed by the Certificate Authority (CA), including the verification of a chain of trust where multiple CAs are involved, as well as a cryptographic challenge-response protocol that provides proof-of-possession of the private key associated with the certificate. Set forth below in detail are example embodiments of the foregoing processes, at least some of which are particularly illustrated in the context of BLE communications although the teachings herein are equally applicable to other types of wireless telemetry or M2M communications, mutatis mutandis.

Figure 4:
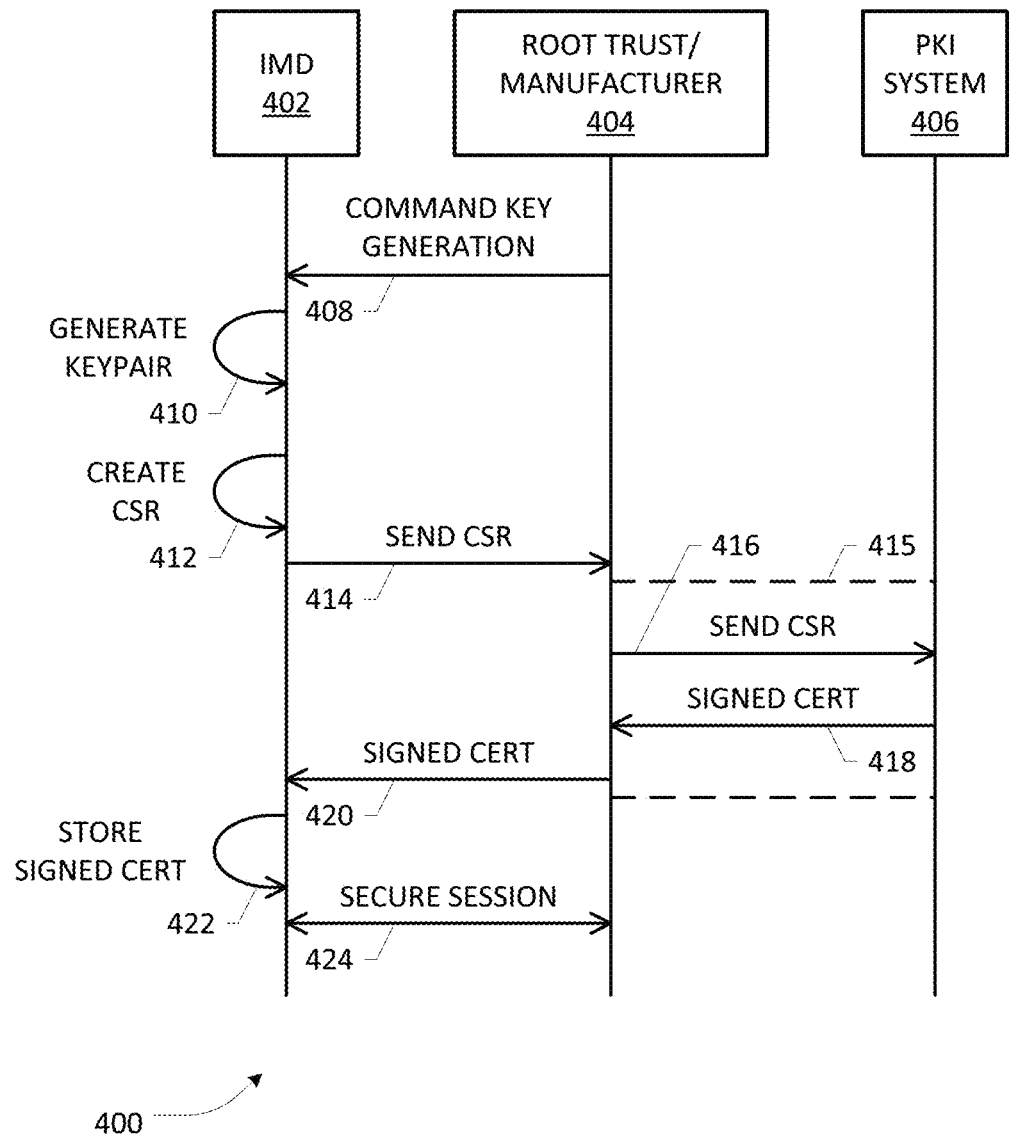
FIG. 4 depicts a message flow diagram associated with IMD provisioning according to an example embodiment of the present patent disclosure.

FIG. 4 depicts a message flow diagram associated with IMD provisioning according to an example embodiment of the present patent disclosure. In one arrangement, message flow diagram 400 is illustrative of provisioning an IMD 402 manufactured/provided by a system 404 that supplies root of trust based on its existing trust relationship with a PKI system 406. As such, IMD 402 does not have wide-area connectivity and, accordingly, IMD 402 relies on system 404 to act as a proxy to the PKI system 406. Provisioning requests from an IMD may therefore be authenticated by virtue of their origin in a trusted manufacturing system in some embodiments. As illustrated, example IMD provisioning may commence with system 404 providing a command 408 operative to instruct IMD 402 to generate a pair of keys, e.g., a public key and a corresponding private key according to an asymmetric cryptography system (e.g., Rivest-Shamir-Adleman (RSA) scheme). Responsive thereto, appropriate software application executing on IMD 402 is operative to generate the key pair, which may be utilized in generating a Certificate Signing Request (CSR), set forth as internal process flows 410, 412, respectively. In one arrangement, the CSR may include various pieces or fields of data, information or other indicia relating to the IMD, e.g., device identifier, date of manufacture, common name, locality, different levels of proof of identity (depending on the levels or classes of assurance desired), among others, as well as the public key. The CSR is provided to system 404, shown in FIG. 4 as message flow 414, whereupon system 404 creates a secure channel 414 to PKI system 406 that is authenticated with its own pre-provisioned credentials. In one arrangement, PKI system 406 may comprise one or more certificate authorities (CAs) (configured to store, issue and sign digital certificates), registrations authorities (RAs) (configured to verify the identity of requesting entities), a central directory (a secure location in which the keys are stored and indexed), and a certificate management system and associated certificate policy. Using the secure channel 414, which may be effectuated over a wide-area network connection, system 404 relays the IMD's CSR to PKI system 406, which verifies and issues a signed digital certificate, e.g., X.509 certificate, that includes the public key of the IMD as well as other data and metadata, which are signed by the CA's private key. The signed certificate, which uniquely identifies the IMD application and binds the IMD's public key thereto, is provided to system 404. In FIG. 4, message flows 416, 418 respectively illustrate the transmission of the CSR from system 404 and the reception of the signed certificate by system 404 via secure channel 415. The signed certificate is relayed back to IMD 402, as illustrated by message flow 420. IMD 402 is preferably adapted to store the signed certificate in a secure storage area along with other secure credential information, e.g., cryptographic public and private keys, issuing CA's certificate, etc. In one arrangement, system 404 may create a secure session 424 with IMD 402 to test that the signed certificate credentials are properly stored.

Figure 5A:
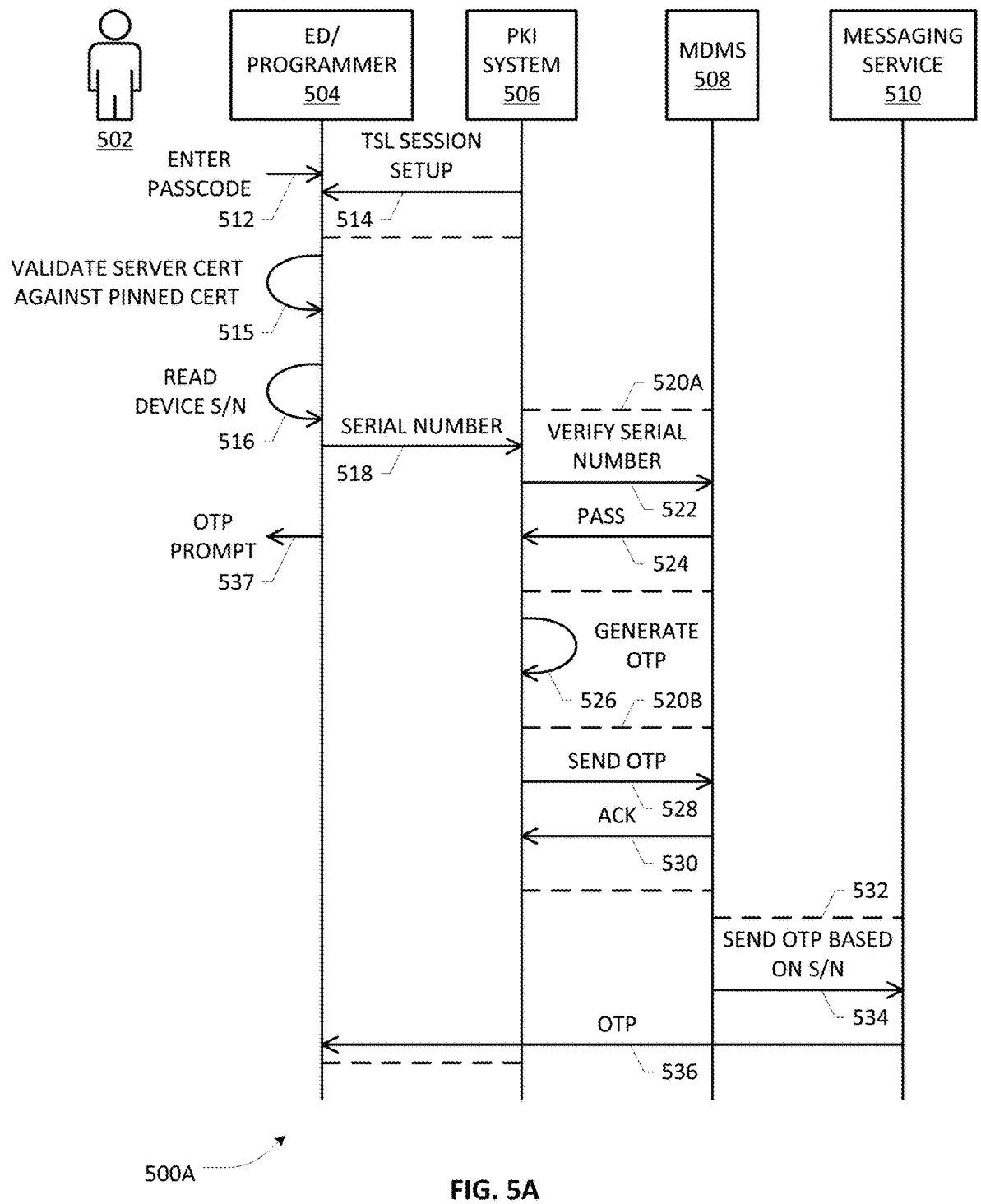
FIGS. 5A and 5B depict message flow diagrams associated with provisioning an external device according to an example embodiment of the present patent disclosure.
Figure 5B:
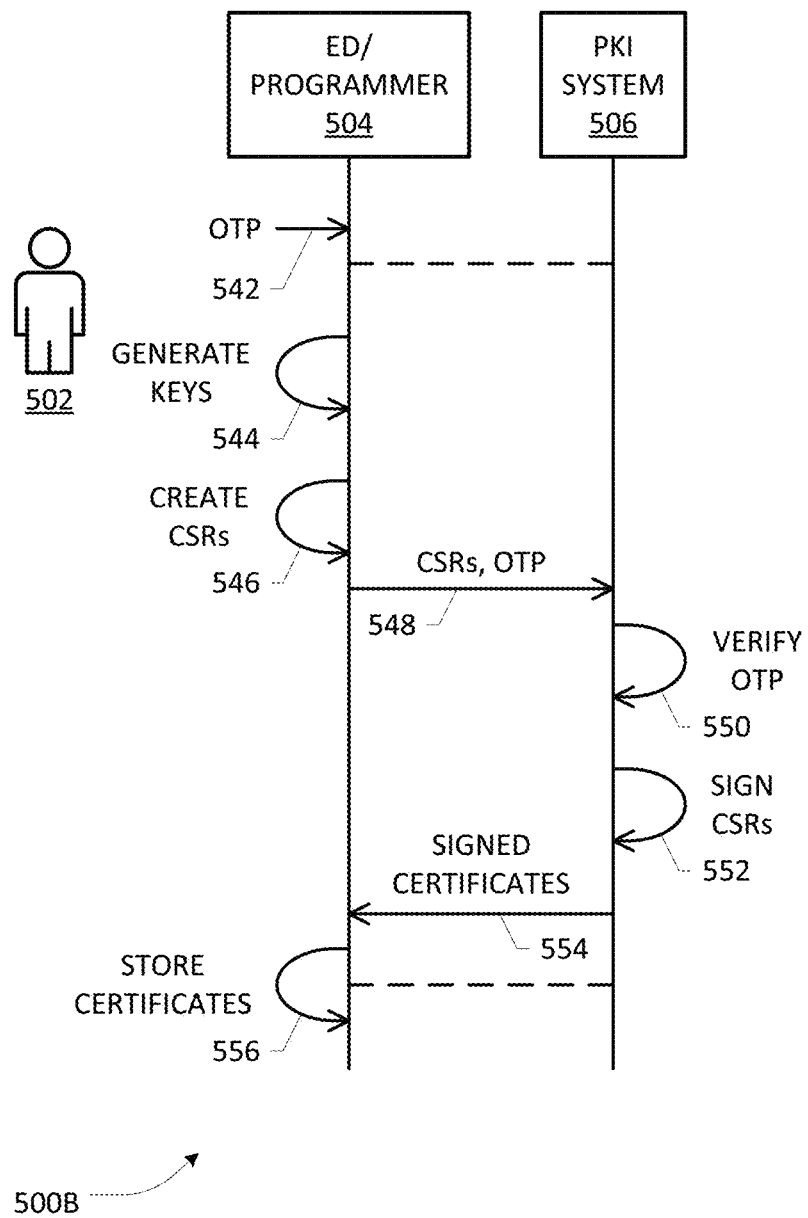

FIGS. 5A and 5B depict message flow diagrams associated with provisioning an external device according to an example embodiment of the present patent disclosure, wherein the external device is a device that is controlled and managed by an authorized mobile device management system (MDMS) associated with the manufacturer of the device and/or associated therapy application components. In general, provisioning requests from such external devices (also referred to as native external devices, as previously noted) may be authenticated by querying the MDMS by a trusted entity to ensure that a requesting device is valid and operated by an authorized user prior to allowing the device to obtain appropriate security credential information associated with a therapy application executing thereon. Message flow diagram 500A of FIG. 5A is illustrative of such interactions that may be verified or validated via example MDMS 508 with respect to example external device 504 operated by a user 502, e.g., a clinician, medical technician or an authorized agent. Prior to provisioning, external device 504 is operative to prompt user 502 to confirm the user's password, passcode and/or other identity confirmation indicia such as biometric indicia, etc., via a suitable interface, as illustrated by message flow 512. Upon verification, a Transport Layer Security (TLS) session 514 may be set up between a PKI system 506 and external device 504 running the application. In one embodiment, a pinned certificate of the PKI system 506 may be used to validate the PKI system's identity, as shown by internal process flow 515. A unique device identity indicium, e.g., a device serial number, may be read, retrieved or otherwise obtained from secure storage, which is illustrated as an internal process flow 516, which is then provided to PKI system 506, as illustrated by message flow 518 via the TLS channel. Responsive thereto, PKI system 506 validates the serial number with MDMS platform 508, e.g., via a secure session 520A therebetween. Upon confirmation of verification of the device serial number by MDMS platform 508, a one-time password (OTP) may be generated by PKI system 508 that may be utilized in ensuring the integrity of the provisioning process. The foregoing flows and processes are illustrated in the message flow diagram 500A as flows 522, 524 and OTP generation 526. Because an OTP-based mechanism is implemented in an example embodiment, a user prompt for notification 537 may be provided to user 502 via a suitable GUI to wait for the arrival of an OTP for entry within a prescribed time. In one arrangement, a random/pseudorandom number or a cryptographic hash may be generated to function as an OTP that is valid only for one provisioning session or transaction login, which may be transmitted to external device 504 via an out-of-band communication system or messaging service 510, e.g., via texting, email, or a voice message, etc., mediated by MDMS platform 508. In some implementations, an OTP scheme may also incorporate two-factor authentication by requiring additional factors based on a Personal Identification Number (PIN), smartcard, smartphone, etc. associated with user 502.

As illustrated, PKI system 506 transmits the OTP to and receives an acknowledgement from MDMS platform 508, e.g., via a secure session 520B operative to effectuate corresponding message flows 528, 530, respectively. In response, MDMS platform 508 is operative to send the OTP to example external device 504 based on the device serial number to ensure that the user/application requesting the security credentials is in possession of the external device. A secure session 532 may be effectuated between MDMS platform 508 and messaging service 510 for providing the OTP, as illustrated by message flow 534. Depending on implementation, messaging service 510 may be configured to effectuate a text message, push notification, or other methods that are tied to device hardware address, etc., for transmitting the OTP to external device 504, as illustrated by message flow 536.

Responsive to the entry of the OTP by user 502, as illustrated by message flow 542 in message flow diagram 500B of FIG. 5B, the therapy application of external device generates one or more key pairs, each comprising a private key and a corresponding public key, using an asymmetric cryptography system (e.g., RSA). Appropriate CSRs may be generated for the public keys, each CSR including various pieces of data and metadata, which may be transmitted along with the OTP to PKI system 506. The foregoing processes and flows are shown in FIG. 5B as processes 544, 546 and flow 548, respectively. Upon verification 550 of the OTP by PKI system 506, PKI system 506 signs the digital certificates with its private key and forwards the signed digital certificates as well as issuing CA's digital certificate to external device 504 for storage. Operations relative to the foregoing functionalities are illustratively shown in FIG. 5B as a sequence comprising process 552, message flow 554 and process 556.

Figure 6A:
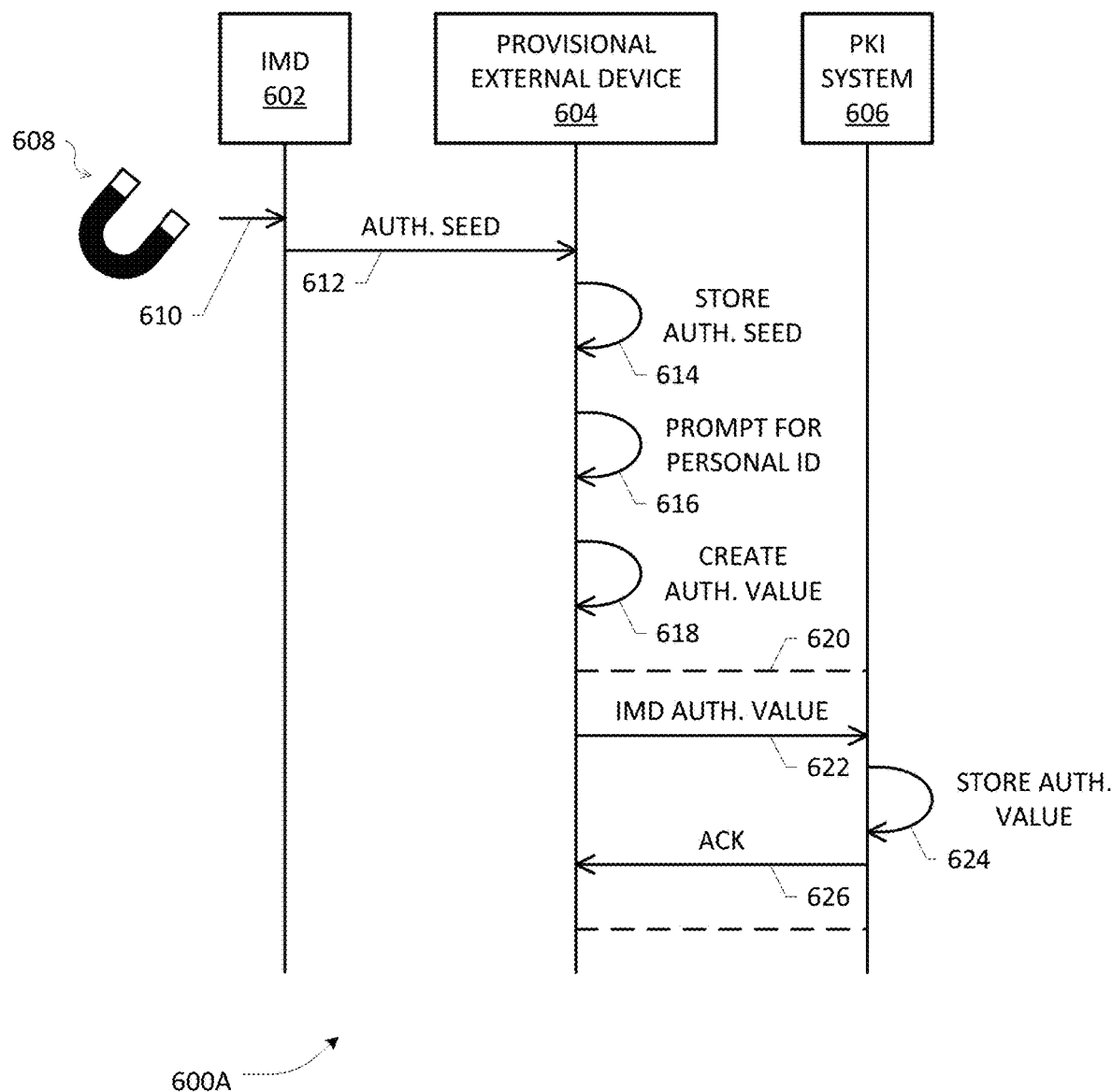
FIGS. 6A and 6B depict message flow diagrams associated with provisioning an external device according to another example embodiment of the present patent disclosure.
Figure 6B:
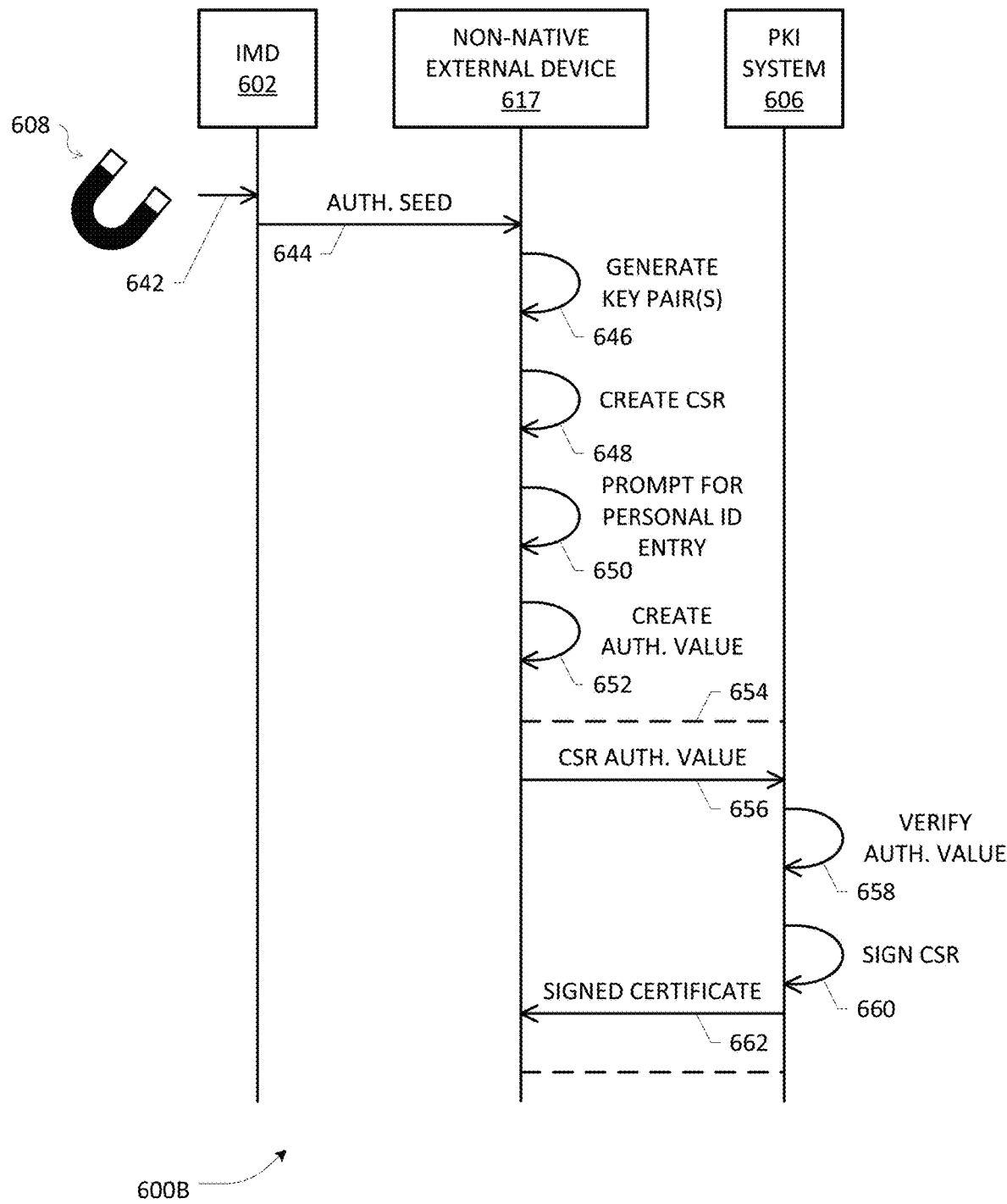

FIGS. 6A and 6B depict message flow diagrams associated with provisioning an external device according to another example embodiment of the present patent disclosure, wherein the external device is not controlled and managed by an authorized mobile device management system (i.e., an alien external device). Provisioning requests from such devices may be authenticated by using the IMD as an authentication token, along with data known by or to the patient in whom the IMD is implanted. Skilled artisans will recognize that such a scheme advantageously provides multi-factor authentication to ensure the integrity of a provisioning session. In one example embodiment, the IMD may be manually enrolled by an already-provisioned external device by combining an IMD-unique authentication seed (e.g., a unique number assigned per IMD, which may be generated randomly by the IMD at the time of manufacture) with the patient-provided data (such as a cognitive password, patient's date-of-birth, or other personal identification indicia) to create a unique value. Additionally, the IMD-unique authentication seed may be made available only when the IMD has been put in a bonding mode, e.g., by holding a magnet over the IMD for a predetermined amount of time, according to some embodiments.

Once the IMD is (pre)enrolled, the user of an alien external device can recreate that value by putting the IMD in a bonding mode (e.g., using a magnet), and entering the patient-provided data into the device. The device (or an application executing thereon) may be configured to combine these two pieces of data in the same manner and send the authentication value to a trusted entity, e.g., the PKI system. If the authentication value from the alien external device matches the pre-enrolled data, the alien external device may then be provisioned by the PKI system with appropriate security credentials in a similar manner as set forth above. An example embodiment of IMD-based provisioning of an alien external device is particularly exemplified in message flow diagrams 600A, 600B, described below, although it should be recognized that other ways of securely provisioning an alien external device are also possible and contemplated within the ambit of the present patent application for purposes of an example embodiment herein.

In one arrangement, a pairing/bonding procedure may be effectuated between two devices, e.g., IMD 602 operating as an authenticating token and a provisioned external device 604, using a proximate triggering device when external device 604 is within the vicinity or presence of a patient having the IMD. In general operation, the triggering device may be configured to emit or transmit an activation field, which may be detected by the IMD. When the activation field is detected by the IMD, the IMD may enter or transition into a communication initialization mode corresponding to a preconfigured pairing and/or bonding procedure involving known or heretofore unknown communication protocols. For example, the pairing and/or bonding procedure may be defined by a wireless protocol (e.g., Bluetooth, BLE, ZigBee, etc.). In some embodiments, a pairing and/or bonding procedure may include exchanging information to generate passkeys in both the IMD and an external device to establish a communication link. Additional details regarding the initiation of a bi-directional communication link between two devices using a proximate triggering device may be found in U.S. Pat. No. 9,288,614, entitled "SYSTEMS AND METHODS FOR INITIATING A COMMUNICATION LINK BETWEEN AN IMPLANTABLE MEDICAL DEVICE AND AN EXTERNAL DEVICE", which is incorporated by reference herein.

Illustratively, an example triggering device 608 may comprise a magnet, an inductive communication circuit, an NFC circuit, an electric motor, etc.), which may be configured to produce or generate an activation field, exemplified by flow 610. IMD 602 may be configured to detect the activation field when the patient's body having the IMD is passed through and/or placed within the activation field, which may comprise at least one of a magnetic field, NFC transmission, RFID transmission, an inductive telemetry signal, or a vibration scheme resulting in displacement of a position sensor associated with IMD 602. Responsive to detecting the activation field, IMD 602 may be programmed and/or configured to enter into a select communication initialization mode for communicating with provisioned external device 604 disposed within a vicinity of the patient. An authentication seed 612 obtained from IMD 602 is stored by external device 604, which generates a prompt for entry of patient-provided data, e.g., patient date-of-birth or other personal indicia. Upon entry of the patient-provided data, an authentication value is generated by external device 604, which is provided to a trusted entity such as PKI system 606 via a secure channel 602. The foregoing operations are illustrated in message flow diagram 600A as processes 614, 616, 618 and message flow 622. Upon receipt, PKI system 606 is operative to store the received IMD authentication value for future verification by an alien external device as will be seen below. In one embodiment, an acknowledgement notification may be provided to provisioning external device 604. The foregoing operations are illustrated as process 624 and message flow 626 in FIG. 6A.

After enrolling IMD 602 as set forth above, an alien external device 607 may be provisioned by utilizing the IMD as an authentication token, which may be put into a communication mode with alien external device 607 using a triggering device, e.g., magnet 608, configured to generate an activation field 642, as illustrated in message flow diagram 600B of FIG. 6B. Once a communication link is established, alien external device 607 is operative to receive the IMD's authentication seed, as illustrated by message flow 644, which may be combined with patient-provided data (e.g., received after a user prompt) for generating an authentication value. Further, a public-private key pair may be generated for facilitating a CSR with respect to the therapy application executing on alien external device 607. Operations relative to the foregoing functionalities are illustrated in message flow diagram 600B as processes 646, 648, 650, 652. Both the CSR and IMD authentication value are transmitted by alien external device 607 to a trusted entity, e.g., PKI system 606, via a secure channel 654. Upon verifying the received IMD authentication value against the previously stored IMD authentication value, PKI system 606 is operative to generate a signed digital certificate, which is provided to alien external device 607 along with the issuing CA's certificate for storage and therapy application authentication with a provisioned IMD. It will be realized that in some example embodiments, enrolling IMDs may be different from provisioned IMDs with which alien external device 607 may communicate for purposes of providing therapy. Operations relative to the foregoing functionalities are illustrated in message flow diagram 600B as a sequence comprising message flow 656, processes 658, 660 and message flow 662.

Figure 7:
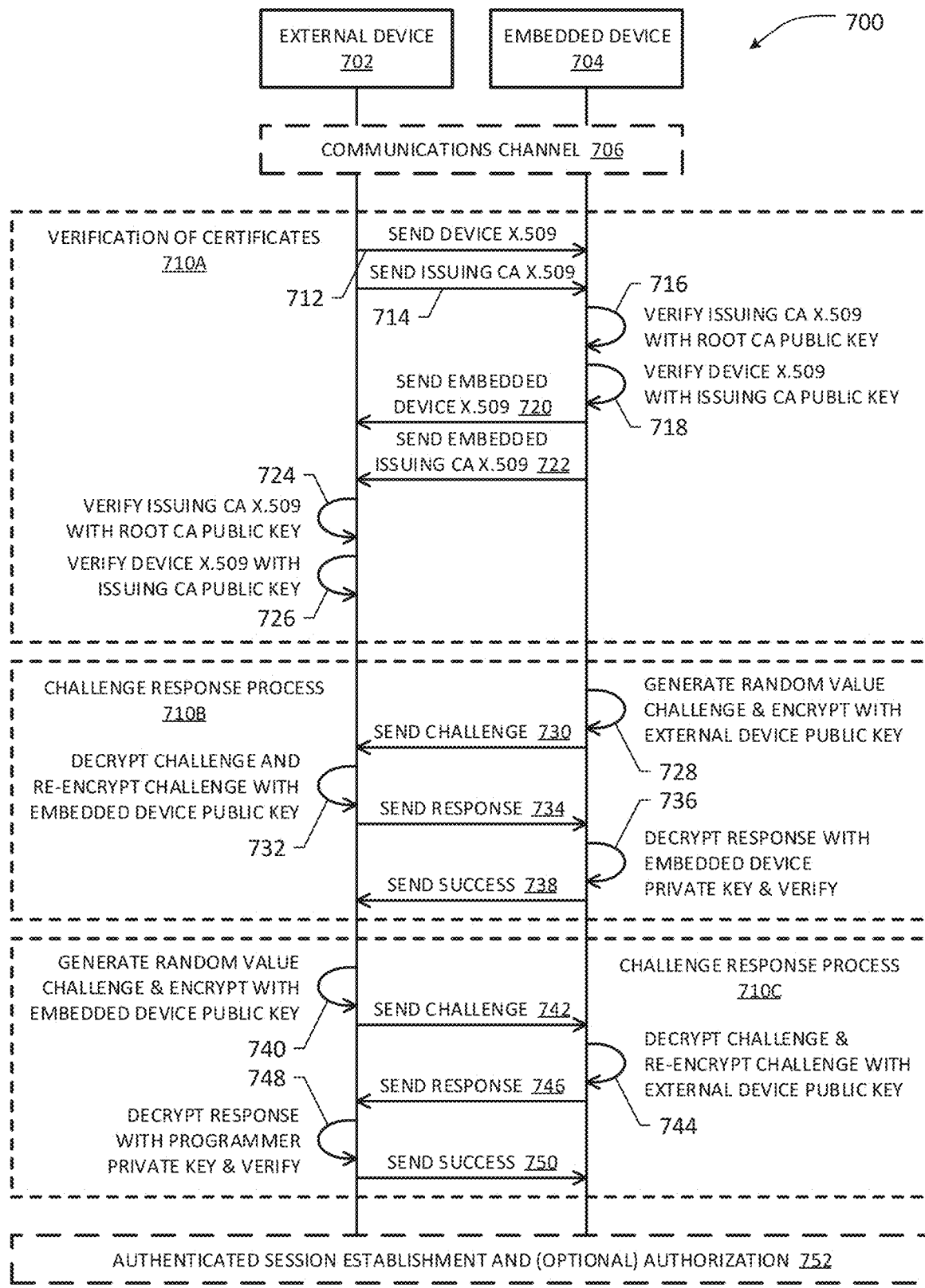
FIG. 7 depicts a message flow diagram associated with establishing a secure authenticated communication channel between a therapy application of a provisioned external device and an IMD using a communication stack of the external device according to an example embodiment of the present patent disclosure.

FIG. 7 depicts a message flow diagram associated with establishing a secure authenticated communication channel between a therapy application of a provisioned external device and an IMD using, e.g., a common communication stack of the external device, according to an example embodiment of the present patent disclosure. In one arrangement, message flow diagram 700 of FIG. 7 may be implemented in connection with a wireless protocol such as BLE, although the teachings herein are equally applicable to other types of wireless telemetry and/or M2M communications between provisioned IMDs and provisioned external devices. In one example embodiment, after both the IMD (i.e., embedded device) and the external device have been provisioned, the IMD may be put into a mode in which it will accept new BLE bonds through use of a magnet. As noted previously, the magnet may be held over the IMD for a predefined period of time to ensure/verify physical custody of the IMD. Once in the bonding mode, standard BLE methods may be invoked on the external device to create a BLE bond between the IMD and the external device using the Low Energy (LE) Secure Connections protocol defined in the Bluetooth specification (e.g., Bluetooth v4.2 or higher), incorporated by reference herein. Once the BLE bond is established, the BLE stack is operative to create an encrypted connection between the IMD and the external device, whereupon a bi-directional cryptographic authentication protocol of an example embodiment of the present invention may be invoked as additional authentication layer for enhanced security as previously noted.

In general operation, an example embodiment of the cryptographic authentication protocol of the present invention may be implemented as a mutual verification process followed by a mutual authentication process between a provisioned IMD and a provisioned external device based on the exchange of respective certified security credential information, wherein the mutual verification process may be initiated by the provisioned external device subsequent to the establishment of a wireless telemetry communication link (e.g., a BLE link). Illustratively, example external device 702 may be a COTS/non-COTS device and/or native/alien device, and operative as a patient controller device, a clinician programmer device, or as a delegated therapy device, as previously noted, which may be configured to effectuate a communication link 706 with a provisioned IMD 704. As such, the certified security credential information may be bound to the applications running on the respective devices for effectuating wireless telemetry communications according to one embodiment. Accordingly, the terms "device" and "application" may be roughly interchangeably used in the following description of an embodiment of the bi-directional cryptographic authentication protocol of the present invention. Reference numeral 710A in message flow diagram 700 of FIG. 7 refers to a message flow sequence exemplary of a process for verifying the digital certificates associated with respective applications of devices 702, 706, wherein a verification of the therapy application's certificate information is executed first followed by a verification of the IMD's certificate information. Reference numerals 710B and 710C refer to mutual/reciprocal authentication processes that may be executed by respective device applications, which may take place in any order.

In one arrangement, certificate verification/validation process 710A between external device application 702 and IMD application 704 may be implemented as follows:

(I) External device/application 702 sends IMD/application 704 its own digital certificate (e.g., X. 509 certificate) along with the certificate of the issuing CA. Where a CA hierarchy is involved, a certificate chain may be accordingly provided. Flows 712, 714 illustrated in FIG. 7 are representative of the foregoing operations.

(II) IMD/application 704 verifies the issuing CA's certificate with the root public key that may be pre-programmed at the time of manufacture. If a certificate chain is involved, each intermediary CA may be verified accordingly. IMD/application 704 uses the verified CA public key to verify that the external device/application's certificate is valid, whereupon the signed external device/application's certificate is decrypted using the verified CA public key and the external device/application's public key is stored in a secure storage. Flows 716, 718 of FIG. 7 are representative of the foregoing operations.

(III) IMD/application 704 then sends external device/application 702 its own digital certificate (e.g., X. 509 certificate) along with the certificate of the issuing CA, including a certificate chain if necessary. Flows 720, 722 are illustrative of the foregoing operations.

(IV) External device/application 702 verifies the issuing CA's certificate with the root public key obtained as part of its provisioning. Again, if a certificate chain is involved, each intermediary CA may be verified accordingly. External device/application 702 uses the verified CA public key to verify that IMD/application's certificate is valid, whereupon the signed IMD/application's certificate is decrypted using the verified CA public key and IMD/application's public key is stored in a secure storage. Flows 724, 726 of FIG. 7 are illustrative of the foregoing operations, which complete the certificate verification/validation process.

In one arrangement, a mutual challenge-response process 710B between external device application 702 and IMD application 704 may be implemented as follows:

(I) IMD/application 704 generates a random value or challenge code (e.g., a cryptographic nonce) and encrypts it with the public key of external device/application 702 to obtain an encrypted random value. The encrypted random value is provided to external device/application 702 as a challenge. These operations are illustrated as flows 728, 730 in FIG. 7.

(II) External device/application 702 decrypts the encrypted random value challenge or code using the private key corresponding to its public key to obtain a decrypted random value. Thereafter, external device/application 702 re-encrypts the decrypted random value using the public key of IMD/application 704 to generate a re-encrypted random value. The re-encrypted random value is provided to IMD/application 704 as a challenge response. Flows 732, 734 of FIG. 7 are illustrative of the foregoing operations.

(III) IMD/application 704 decrypts the challenge response (i.e., the re-encrypted random value) using the private key corresponding to its public key to obtain a decrypted challenge response and determines as to whether the decrypted response matches the random value or challenge code it issued previously. This determination verifies, for the IMD/application, that the device, software component or application on the other end of the communication channel over the wireless telemetry link is indeed in possession of the private key of the device, software component or application associated with the signed certificate thereof (i.e., external device/application's certificate) that was presented during validation. If there is a match, a "Success" notification may be forwarded to external device/application 702. These operations are illustrated as flows 736, 738 in FIG. 7.

In one arrangement, a reciprocal mutual challenge-response process 710C between external device application 702 and IMD application 704 may be implemented in a substantially similar manner as follows:

(I) External device/application 702 generates a random value or challenge code and encrypts it with the public key of IMD/application 704 to obtain an encrypted random value. The encrypted random value is provided to IMD/application 704 as a challenge. Flows 740, 742 of FIG. 7 are illustrative of the foregoing operations.

(II) IMD/application 704 decrypts the encrypted random value using the private key corresponding to its public key to obtain a decrypted random value. Thereafter, IMD/application 704 re-encrypts the decrypted random value using the public key of external device/application 702 to generate a re-encrypted random value. The re-encrypted random value is provided to external device/application 702 as a challenge response. Flows 744, 746 of FIG. 7 are illustrative of the foregoing operations.

(III) External device/application 702 decrypts the challenge response (i.e., the re-encrypted random value) using the private key corresponding to its public key to obtain a decrypted challenge response and determines as to whether the decrypted response matches the random value challenge it issued previously. This determination verifies, for the external device/application, that the device, software component or application on the other end of the communication channel over the wireless telemetry communication link is indeed in possession of the private key of the device, software component or application associated with the signed certificate thereof (i.e., IMD/application's certificate) that was presented during validation. If there is a match, a "Success" notification may be forwarded to IMD/application 704. Flows 748, 750 of FIG. 7 are illustrative of the foregoing operations.

Once the mutual challenge-response processes 710B/710C are successfully completed, the communication session between external device/application 702 and IMD/application 704 over the wireless telemetry communication link may be considered an authenticated session, i.e., respective identities of external device/application 702 and IMD/application 704 are mutually verified. In some arrangements, IMD/application 704 may be configured to inspect the attributes of the external device/application's certificate (e.g., provided via one or more data/metadata fields of the certificate) in order to determine the certificate holder's appropriate privilege/authorization level (e.g., whether the certificate is associated with a patient or clinician, or respective agents, etc.) and authorize appropriate communications via the authenticated session accordingly.

As previously noted, the mutual challenge-response processes 710B/710C described above may be executed in any order. Accordingly, either of respective random value challenges and/or corresponding challenge responses illustrated in the message flow diagram of FIG. 7 may be referred to as "first" and "second" random value challenges and/or challenge responses without necessarily signifying any particular order in an example embodiment.

Figure 8:
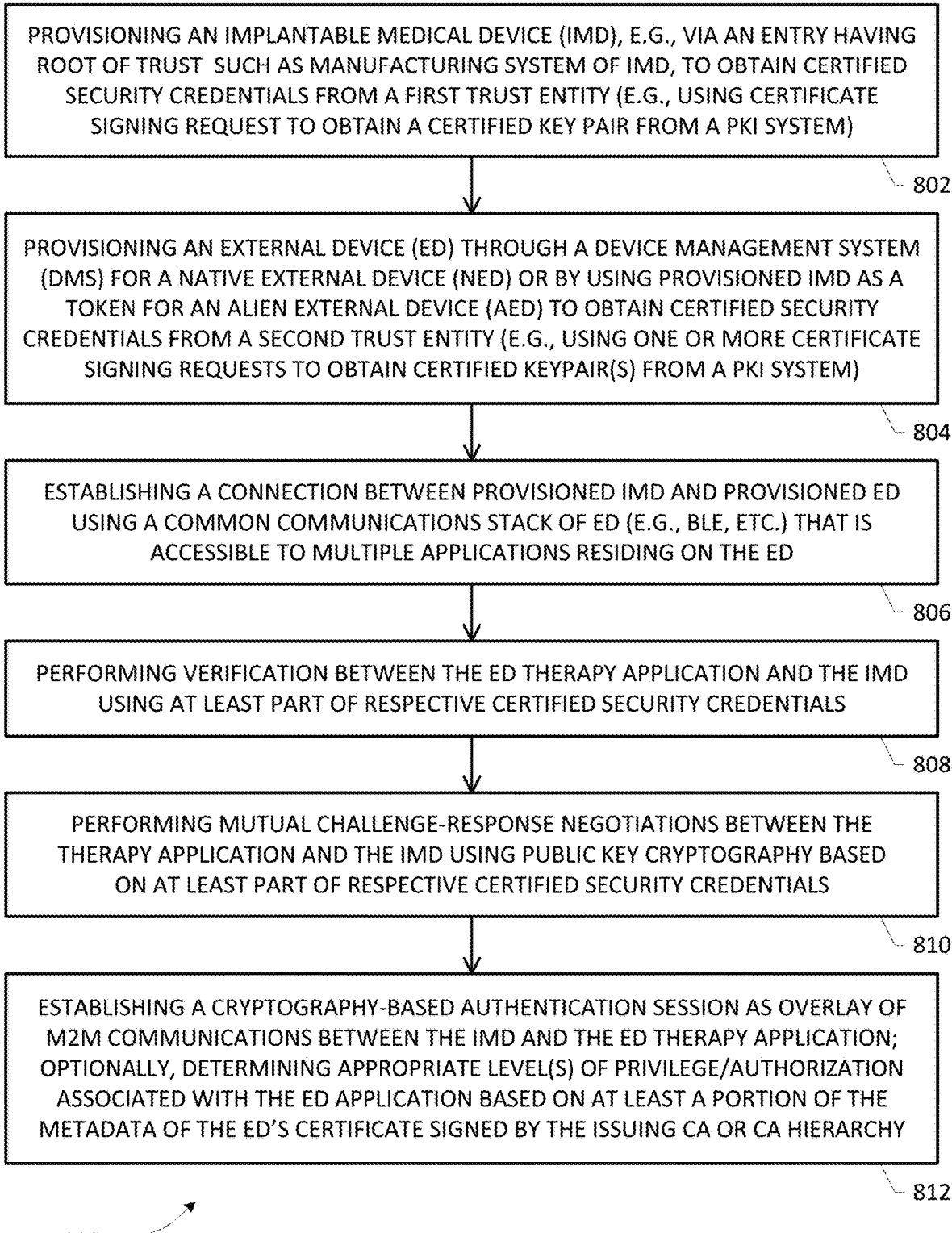
FIG. 8 depicts a flowchart illustrative of blocks, steps and/or acts that may be (re)combined in one or more arrangements with or without additional flowcharts or message flow diagrams of the present patent disclosure for facilitating a secure authenticated communication channel between a therapy application of a provisioned external device and an IMD according to some embodiments.

FIG. 8 depicts a flowchart illustrative of blocks, steps and/or acts that may be (re)combined in one or more arrangements with or without additional flowcharts or message flow diagrams of the present patent disclosure for facilitating a secure authenticated communication channel between a therapy application of a provisioned external device and an IMD according to some embodiments. Example process 800 may commence with provisioning an IMD (or more generally, a personal medical device) via an entity having root of trust such as the manufacturer of the IMD to obtain certified security credentials from a first trust entity (e.g., by issuing a certificate signing request to obtain a digital certificate from a PKI system), as set forth at block 802. Provisioning of an external device (ED) may be effectuated through a device management system (DMS) for a native external device (NED) or by using a provisioned IMD as an authentication token for an alien external device (AED) to obtain certified security credentials from a second trust entity (e.g., using one or more certificate signing requests to obtain digital certificates from a PKI system), wherein the certified security credentials are associated with a therapy application executing on the external device, as set forth at block 804. At block 806, a wireless telemetry connection may be established between the provisioned devices using a suitable protocol stack, e.g., a common communications stack of the ED (e.g., BLE, etc.) that may be accessible to multiple applications, programs or other code residing on the ED in addition to the provisioned therapy application. At block 808, a verification/validation process may be effectuated between the ED therapy application and the IMD using at least part of respective certified security credentials. At block 810, a mutual challenge-response process may be effectuated between the therapy application and the IMD, which may involve cryptographic negotiations using public key cryptography based on at least part of respective certified security credential information. Upon successful mutual authentication, a cryptography-based authentication session may be established as overlay of wireless telemetry communications between the IMD and the ED therapy application. Optionally, appropriate level(s) of privilege/authorization associated with the ED application may be determined by the IMD based on at least a portion of the metadata of the ED's certificate signed by the issuing CA or CA hierarchy, as set forth at block 812. Accordingly, an example embodiment may be configured to provide robust authentication for applications on different hardware/software platforms while according individualized or customized authorization levels to different classes of devices, users, and applications, regardless of whether such applications are hosted by COTS devices. For example, different schemes of revocation lists, time-of-day constraints, therapy level constraints, etc. may be implemented depending on whether a provisioned application is configured as a patient controller application, a clinician programmer application, or as a delegated caregiver or passive monitor application, and the like, without compromising the level of authentication and privacy desired in myriad healthcare environments. Further, such privilege/authorization levels may be remotely controlled, modified, disabled, etc. e.g., via over-the-air (OTA) mechanisms by the therapy application provider/manager.

In additional and/or alternative embodiments, some example arrangements of the present patent disclosure may include, systems, methods and associated computer-readable media for authenticating and/or authorizing an external device to an IMD, either in combination with or separate from the foregoing embodiments relating to application authentication and/or authorization. As noted previously, external devices (e.g., a patient controller, a clinician programmer, or a delegated agent device, etc.) may communicate using BLE, WiFi, or other commercial protocols compatible with commercial wireless devices such as tablet computers, smartphones, and the like, wherein the commercial protocols have limited pairing procedures for establishing secure communication links. Further, commercial protocols may require inputting of security keys or passkeys to establish the secured connection with an IMD in a user interface process that is susceptible to external threats such as hacking, eavesdropping, etc. Therefore, it should be appreciated that a separate need exists for improved methods and systems that establish a secure communication link with an IMD using a commercial protocol for device authentication and/or authorization.

In some embodiments, an IMD such as an implantable pulse generator used in neuromodulation systems may require presentation of authentication data to allow an external device to connect and communicate with the IMD. Accordingly, ensuring that only valid external devices have access to such authentication data is of fundamental importance to ascertaining that the system is secure from unauthorized access. Embodiments set forth further below employ various innovative concepts to address one or several implementational and/or architectural challenges relating to the foregoing security requirements. Where a static, universal authentication data, key, or indicium (also referred to as an authentication parameter) is provided with respect to an external device that allows it to authenticate itself to a class of IPGs, such a parameter may be hard-coded in a software application, which may be generated on the initial run of the application. The authentication parameter may be combined with observable data from the IPG (e.g., model number, serial number, etc.) to create an authentication code unique to the IPG, wherein the role of the external device may be configured based on privileges and/or therapy modalities associated with the session type, i.e., as a clinician device, patient device, or a delegated device, etc. In one arrangement, a plurality of external devices belonging to a particular class (e.g., a clinician device, patient device, or a delegated device, etc.) may be configured with a same strength key (e.g., a medium or high strength key for clinician devices and a low strength key for patient devices). In some arrangements, the privilege level or role configured for an external device at bonding time in the IPG may be of an enduring association, wherein the future sessions may have to match the role established at the time of bonding. In some arrangements, the foregoing functionality or logic may be implemented in a communication protocol proxy (e.g., BLE communication proxy) executing on the external device.

Figure 9:
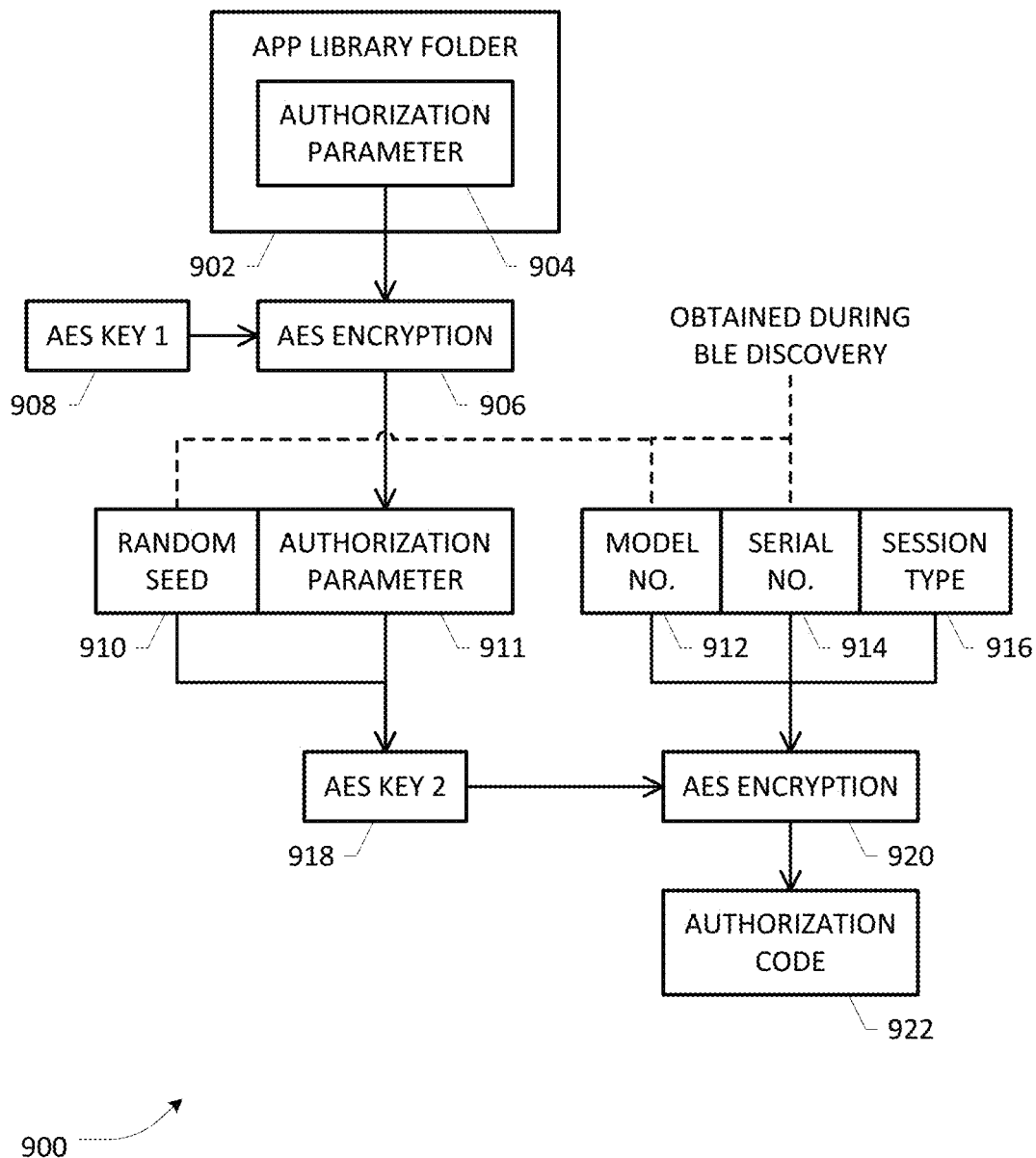
FIG. 9 depicts an authorization code generation scheme for facilitating device authentication in some embodiments.

FIG. 9 depicts an authorization code generation scheme 900 involving the construction of an authentication parameter in a secure, IPG-specific manner. An example external device may be provided with a program application having a library folder 902 may include appropriate software and/or firmware configured to generate an authorization parameter 904 of suitable length when the software is first run. In one arrangement, the authorization parameter 904 may be encrypted using a symmetric key encryption technique using a symmetric key (key1) 908. In one arrangement, the symmetric key used for the encryption of authentication parameter 904 may be dynamically generated or otherwise provided, e.g., according to the Advanced Encryption Standard (AES), wherein the key may have a suitable length, e.g., a 128-bit key length conforming to AES-128, a 192-bit key length conforming to AES-192, and a 256-bit key length conforming to AES-256.

In one arrangement, a communication protocol proxy of the external device may be invoked, e.g., a BLE proxy, during a known device discovery process engaged by the external device when disposed in the vicinity of the IPG/IMD. In one example embodiment, after both the IMD (i.e., the embedded device) and the external device have been provisioned, the IMD may be put into a mode in which it will accept new BLE bonds through use of a magnet. As noted previously, the magnet may be held over the IMD for a predefined period of time to ensure/verify physical custody of the IMD. Once in the bonding mode, standard BLE methods may be invoked on the external device to create a BLE bond between the IMD and the external device using the LE Secure Connections protocol defined in the Bluetooth specification (e.g., Bluetooth v4.2 or higher) in an example embodiment, as previously set forth. Once the BLE bond is established, the BLE stack is operative to create an encrypted connection between the IMD and the external device, whereupon appropriate IMD-specific data may be exchanged between the external device and the IMD. As illustrated, a random seed 910, IMD model number 912 and serial number 914, as well as other IMD-specific indicia (e.g., date of manufacture, implant, etc.) may be obtained. A session type parameter 916 may be configured to specify the role associated with the external device/application. In one arrangement, the random seed 910 may comprise a static identification and dynamic seed that may be transmitted from the IMD through a dedicated advertisement channel to the external device.

Upon obtaining the foregoing pieces of data, the BLE communication protocol proxy may engage in another round of AES-based encryption 920 with reference to a combination of the IMD data 912, 914 and session type 916 using a key 918 generated from the random seed 910 and previously encrypted authorization parameter 911. As illustrated in FIG. 9, an authorization code 922 is thereafter generated by AES encryption 920 that may be used to authenticate with the IMD for subsequent communications therewith.

It will be appreciated that although a wireless protocol proxy such as BLE proxy has been exemplified in the above scheme, the teachings herein are equally applicable to other types of wireless telemetry and/or M2M communications between provisioned IMDs and provisioned external devices in some embodiments. Skilled artisans will also recognize that some example embodiments of the foregoing scheme may still encounter security challenges depending on specific implementation scenarios. For example, where the authentication parameters are configured as universal, e.g., applicable to a class of IPG devices, a single unauthorized disclosure may compromise the entire group of devices in the field. Some example configurations may involve storing the authorization parameter in a device Operating System (OS) file structure (e.g., iOS file system, Android file system, etc.) instead of a secure keychain. Accordingly, an inadvertent/unauthorized disclosure could occur from known or heretofore unknown OS vulnerabilities that allow files to be read. Further, not all exploits that would allow file reading in an OS are 100% detectable by compromise detection methods that may be implemented in an external device in order to help safeguard the file storage system. Moreover, some existing communication protocol proxies are hard-coded to take the file path as an input in constructing the authorization codes. These and other challenges can also be exacerbated where the authorization parameters are hard-coded in the application programs, or when the application programs are freely distributed via public app stores, etc.

Some example embodiments may therefore involve additional and/or alternative design solutions with respect to addressing at least some of the foregoing aspects. For example, instead of configuring universal authorization/authentication parameters, the IMD firmware may be configured to engage in a PKI-based authentication scheme, which may involve one or several certificate exchange processes, e.g., similar to the schemes previously described. Some embodiments may be configured such that the authorization/authentication parameter is stored in the external device's keychain, which may be implemented as an additional secure infrastructure and associated Application Programming Interfaces (APIs) for facilitating storage and retrieval of passkeys and other sensitive credentials. The communication proxy of the external device may also be configured to take the stored authorization/authentication parameter as a direct byte array instead of a file path. In some other arrangements, instead of hard-coding into the application, the authorization/authentication parameters may be delivered to the devices and applications via a backend system, e.g., via an enterprise device management system in a provisioning mode, similar to some of the embodiments previously described.

In still further and/or alternative embodiments where remote care therapy is involved, an external device may be operative as a remote clinician device for providing therapy via a trusted communication link over a network (e.g., the Internet) in a remote therapy architecture. In such a scenario, external devices (including patient controller devices having privilege levels upgraded to levels similar to the levels of clinician devices) may be provisioned with authorization/authentication parameters via a remote therapy backend (RTB) system during, e.g., a registration process. Details regarding a remote therapy backend system and architecture may be found in one or more of the following common-owned co-pending patent application(s): (i) "SYSTEM, METHOD AND ARCHITECTURE FOR FACILITATING REMOTE PATIENT CARE", application Ser. No. 16/449,056, filed Jun. 21, 2019; (ii) "UI DESIGN FOR PATIENT AND CLINICIAN CONTROLLER DEVICES OPERATIVE IN A REMOTE CARE ARCHITECTURE", application Ser. No. 16/896,694, filed Jun. 9, 2020; (iii) "SYSTEM AND METHOD FOR MODULATING THERAPY IN A REMOTE CARE ARCHITECTURE", application Ser. No. 16/900,202, filed Jun. 12, 2020; and (iv) "DATA LABELING SYSTEM AND METHOD OPERATIVE WITH PATIENT AND CLINICIAN CONTROLLER DEVICES DISPOSED IN A REMOTE CARE ARCHITECTURE", application Ser. No. 16/901,368, filed Jun. 15, 2020; each of which is incorporated by reference herein.

Similarly, the distribution of external device applications having a coded authentication parameter may also be controlled using appropriate restrictions in lieu of public app stores in some arrangements. Where the authorization/authentication parameters are stored in a backend infrastructure, e.g., a cloud-based system, it should be appreciated that any exchange from the cloud via secure channels, e.g., via a TLS channel, may still be vulnerable to external eavesdroppers and hackers, as well as insider threats and accidental disclosures, thereby potentially leading to credential theft and/or security breach.

In further arrangements, additional and/or alternative embodiments set forth below may be advantageously configured to utilize what may be referred to as "split knowledge concepts" in order to mitigate the foregoing risks. In an example implementation, the authentication parametric data may be mathematically split into multiple components wherein at least one component is embedded in the external device whereas the remaining components may be secured in different external arrangements. The external components may be made available to the external device in a secure manner, which may then be combined to form a complete, reconstituted authentication data that may be presented to the IMD for authentication. In one embodiment, the external device authentication data (also referred to as the authentication parameter) may be split into two halves-one half is hidden within the software of the external device using obfuscation methods to make reverse-engineering difficult, while the second half may be delivered via a cloud system after authenticating the external device using various means (such as an authentication token, username/password combination, or other authentication methods). The external device may reconstitute the full authentication data and communicate to the IMD thereafter.

Figure 10:
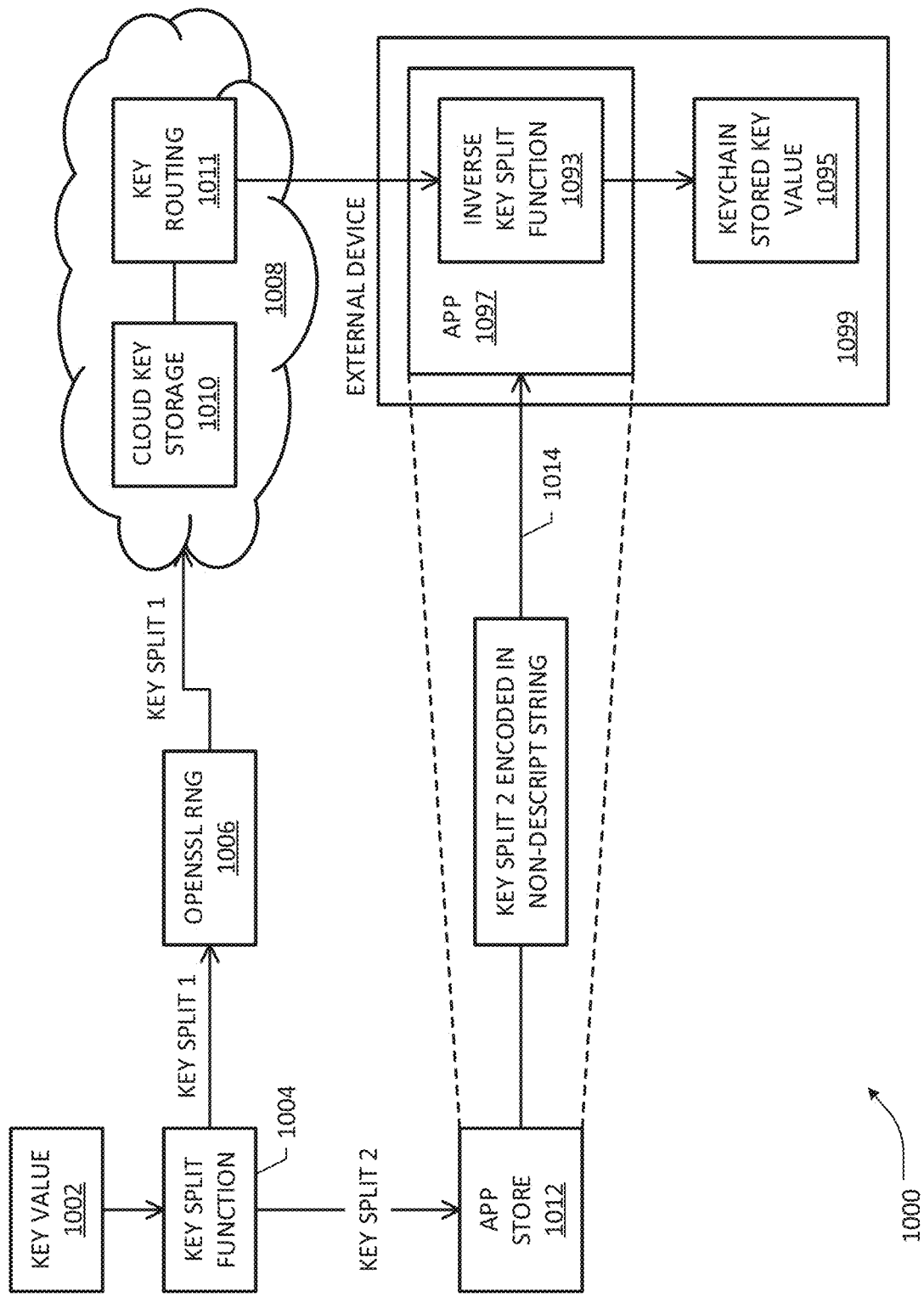
FIG. 10 depicts a split key distribution system wherein an external device is operative to receive split key components for constructing a device authorization/authentication parameter according to an example embodiment.

FIG. 10 depicts a split key distribution scheme or system 1000 wherein an external device 1099 is operative to receive, obtain or otherwise generate a device authorization/authentication parameter according to an example embodiment involving a split key architecture. Broadly, a functional implementation involving system or architecture 1000 may comprise modules configured to effectuate the following aspects in an example arrangement:

(A) Binary value of a key (e.g., having a predetermined strength such as a medium key) split during development through mathematical split process:
    one-time operation during development:
        generate random 128-bit value using, e.g., OpenSSL (validated Network Policy Server (NPS))
        combine binary value with key value through reversible logic functions (e.g., bitwise Exclusive OR (XOR))
        key split 1: Random 128-bit value
        key split 2: Result of function combining key value and random 128-bit value (B) Key splits delivered to end location (e.g., the external device) via disparate methods
    key split 1 uploaded to cloud system and stored in a cloud key vault (e.g., Azure, AWS, etc.)
    key split 2 embedded in the external device app's source code, e.g., encoded in non-descript string (i.e., "hiding in plain sight")

As previously noted, the external device application may be configured to perform a key reconstitution process, e.g., by executing an inverse of the mathematical split process, in order to retrieve, (re)generate, (re)combine or otherwise (re)constitute the original key value. Once the full key value is obtained, it may be stored in a keychain. In one arrangement, the external device may be configured such that the stored authentication parameter may be accessed on each connection to the provisioned IPG/IMD.

Blocks 1002, 1004 of system 1000 exemplify the original key generation and key splitting aspects as set forth above.

Blocks 1006, 1012 exemplify split key distribution processes, wherein key split 1 is uploaded to a cloud network, platform or database center 1008 and key split 2 is embedded in the application that is available via an app store 1012. Cloud key vault or storage 1010 is operative with appropriate device verification and key routing system 1011 that may be configured to validate external device 1099 when a request for accessing or retrieving the stored key split 1 is received therefrom, e.g., by way of the launching of the external device application 1097 and executing an authenticated API call over TLS. As previously noted, device application 1097 includes key split 2 encoded in nondescript string using any known or heretofore unknown string encoding techniques, which may be downloaded as exemplified by block 1014. An inverse key split function block 1093 of the device application module 1097 is operative responsive to key split 1 received from the cloud key vault 1010 (e.g., delivered via an authenticated API call over TLS) and key split 2 obtained via the app store 1012 to execute a logical inverse operation that is a mathematical inverse of the key split functionality (e.g., including, inter alia, logical XNOR, etc.) in order to obtain the full, reconstituted authentication parameter. A keychain storage 1095 may be provided as part of the external device's secure storage area, e.g., block 214 shown in FIG. 2, for storing the reconstituted authentication parameter, which may be accessed on a session-by-session basis when communicating with the IMD. In one example embodiment, the IMD may be configured as IMD 302 shown in FIG. 3, wherein appropriate firmware may be provided as part of modules 310 and 314 for verifying the authentication parameter information received from the external device 1099, which may be configured as device 200 shown in FIG. 2 set forth above.

In one arrangement, at least some aspects of the foregoing authentication methodology may be integrated within a remote therapy backend system and architecture, similar to some arrangements set forth previously. Some aspects may be integrated within a device registration process, wherein an API may be provided to a remote care server (e.g., RTB server) for a device with respect to effectuating key splitting in response to a request (e.g., a patient controller or PC with JWT to request key split). Preferably, such a process may be rendered transparent to the user while enabling remote care on the device for the first time.

Figure 11:
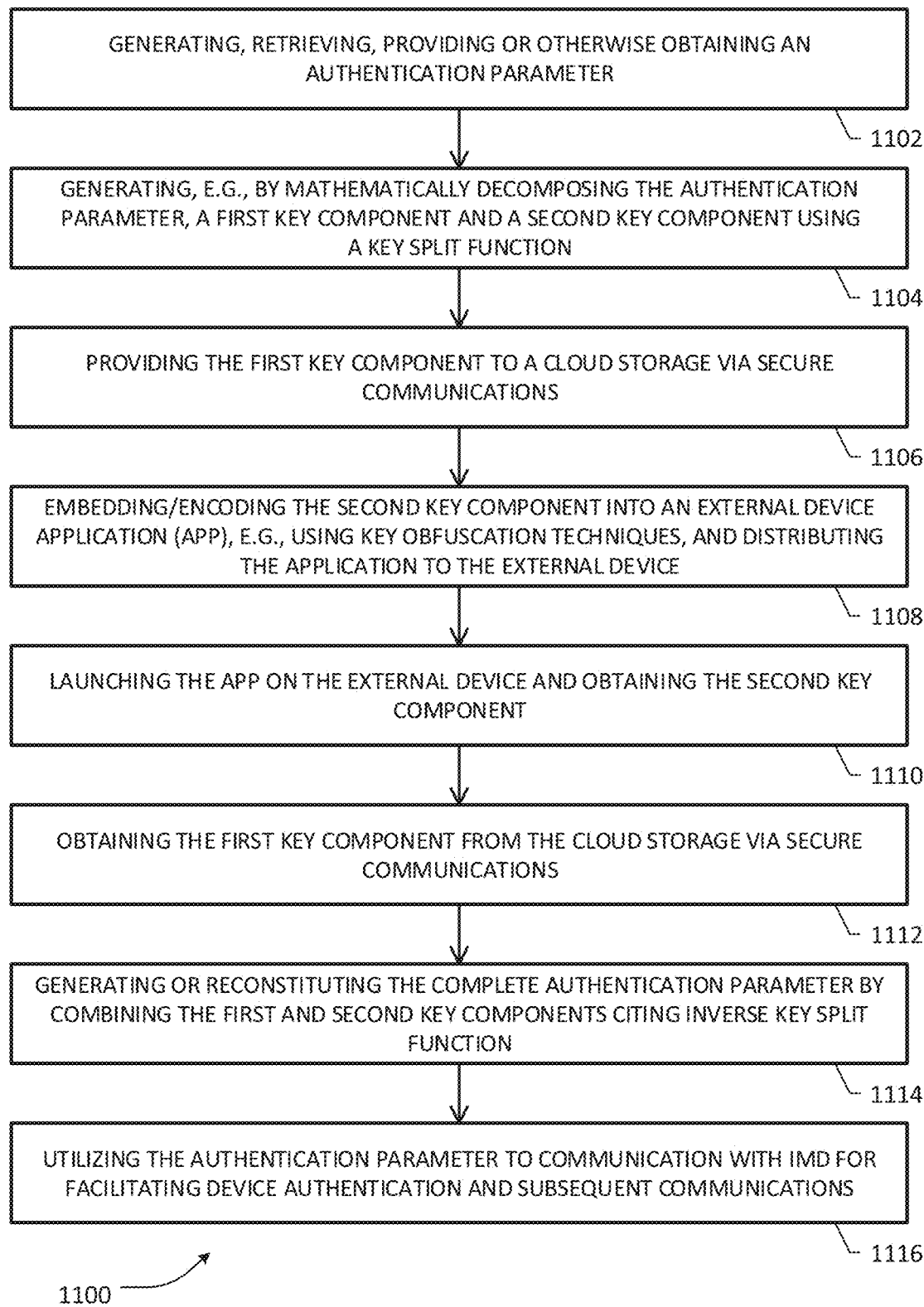
FIG. 11 depicts a flowchart illustrative of blocks, steps and/or acts that may be (re)combined in one or more arrangements with or without additional flowcharts or message flow diagrams of the present patent disclosure for facilitating a device authentication process based on split key distribution according to some embodiments.

FIG. 11 depicts a flowchart illustrative of blocks, steps and/or acts that may be (re)combined in one or more arrangements with or without additional flowcharts or message flow diagrams of the present patent disclosure for facilitating a device authentication process based on split key distribution according to some embodiments. At block 1102 of example process 1100, an authentication parameter comprising a binary value having known key strength and/or key length is generated, obtained or provided. At block 1104, a first key component and a second key component may be generated from the authentication parameter, e.g., by mathematically decomposing into using a key split function involving the binary key value. At block 1106, the first key component may be provided to a cloud storage vault via secure communications (e.g., OpenSSL). At block 1108, the second key component may be embedded or encoded into an external device application (app), e.g., using key obfuscation techniques, that may be distributed to the external device via a public or private app store and/or via other distribution mechanisms (e.g., preloaded, over-the-air download from a manufacturer or an enterprise, etc.). In general, "obfuscation" may refer to a collection of ad-hoc techniques that may be configured to turn program code objects into scrambled objects so as to retain functionality while making objects look complicated or unintelligible in a manner that can thwart unauthorized access. Obfuscation may be based on software code layout obfuscation. For example, such a process may involve replacing identifier names in source or intermediate code with arbitrary values, removal of formatting information in source or intermediate files, and/or removal of comments explaining or describing the code or objects. Obfuscation may also involve data obfuscation that makes data structures and objects less intelligible or comprehensible. Further, control flow obfuscation techniques may also be implemented in additional or alternative arrangements wherein internal program flow among various modules and objects may be altered in some manner. In some optional variations, string-based obfuscations may involve bit manipulations such as XOR operations, DESede, AES, and the combination of bit manipulation and AES, along with a variety of encodings such as, e.g., Base64 (B64), URLEncoder (URL), Base85, (B85), or custom encodings (custom), or splitting a string and concatenating the characters at the beginning and the end of the new string, etc. depending on implementation.

In one arrangement, the therapy application including the embedded second key component is distributed to or otherwise obtained by the external device via at least one of a public app store, a private app store, a File Transfer Protocol (FTP) site, an enterprise device management system, a push mechanism and/or a pull mechanism, although other methods may also be used in some alternative/additional embodiments. At block 1110, the downloaded app may be launched on the external device (e.g., on initial run), whereby the second key component may be retrieved, regenerated or otherwise obtained via de-obfuscation techniques. In one arrangement, de-obfuscation logic may be provided via the application code itself or via other communication and/or storage channels. At block 1112, the first key component may be obtained from the cloud storage via secure communications upon presentation of suitable credentials, e.g., authentication tokens, two-factor authorization indicia, username/password combinations, etc., which may be interrogated by the cloud storage system as previously noted. At block 1114, an inverse key split function may be executed to obtain the complete authentication parameter (i.e., the reconstituted authentication parameter) by combining the first and second key components in a mathematical relationship. At block 1116, the authentication parameter may be stored in a keychain, and may be accessed on per-session basis for communication with IMD in order to facilitate device authentication and subsequent communications. In some optional arrangements, the authentication parameter may be accessed and used in a manner similar to establishing a secured connection over BLE as set forth in U.S. Pat. No. 9,445,264, entitled "SYSTEM AND METHOD FOR ESTABLISHING A SECURED CONNECTION BETWEEN AN IMPLANTABLE MEDICAL DEVICE AND AN EXTERNAL DEVICE", which is incorporated by reference herein.

Based on the foregoing Detailed Description, it will be appreciated that example embodiments provide an authentication system and method that facilitates an additional layer of assurance that only authorized therapy applications executing on authenticated external devices are allowed to communicate with embedded medical devices, especially where standardized communication protocols and stacks are implemented that may be accessible to a number of legitimate and not-so-legitimate applications and software programs. An additional technical benefit of the disclosed bi-directional authentication scheme is that the inter-device access between external devices and IMDs is rendered cryptoanalytically robust regardless of the modality of a COTS external device, e.g., be it configured as a patient controller device or a clinician programmer device, which may be permitted to have a higher level of functionalities and capabilities with respect to the IMD, stimulation settings, programs or therapy controls, or as a delegated agent device having significantly reduced capabilities as to what it can do with an IMD.

Although specific examples of cryptography systems, PKI-based trust anchors, certification schemes, etc. have been particularly described, it should be understood that embodiments herein are not necessarily limited thereto and various other counterpart schemes or systems may be implemented in an example bi-directional authentication scheme according to the teachings of the present disclosure in additional and/or alternative embodiments. For example, other approaches to trust provisioning may be employed, such as, e.g., web of trust (WoT), decentralized PKIs, blockchain-based PKIs, self-signed certificates, and the like. Alternative public key cryptography schemes comprising Diffie-Hellman, Elliptic Curve Cryptography (ECC), Digital Signature Algorithm (DSA), and El Gamal schemes, etc., may be implemented in generating suitable key pairs for purposes of an example embodiment. Likewise, an example implementation of the bi-directional mutual authentication protocol of the present disclosure may be augmented with additional schemes involving cryptographic hashing functions, digital fingerprints, checksums, etc., to further protect against man-in-the-middle attacks and subsequent replay attacks.

Furthermore, it will be apparent to skilled artisans that the operations relating to IMD provisioning and the operations relating to external device provisioning may take place at different times and/or locations in some embodiments. Still further, an example embodiment may involve only one-way verification and/or authentication, e.g., verification and/or authentication by the IMD with which an external device application desires to communicate using a communication protocol stack hosted by the external device.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to one or more circuit diagrams/schematics, block diagrams and/or flowchart illustrations. It is understood that such diagrams and/or flowchart illustrations, and combinations of blocks in the block diagrams and/or flowchart illustrations, can be implemented by any appropriate circuitry configured to achieve the desired functionalities. Accordingly, example embodiments of the present disclosure may be embodied in hardware and/or in software (including firmware, resident software, micro-code, etc.) operating in conjunction with suitable processing units or microcontrollers, which may collectively be referred to as "circuitry," "a module" or variants thereof. An example processing unit or a module may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine, as well as programmable system devices (PSDs) employing system-on-chip (SoC) architectures that combine memory functions with programmable logic on a chip that is designed to work with a standard microcontroller. Example memory modules or storage circuitry may include volatile and/or non-volatile memories such as, e.g., random access memory (RAM), electrically erasable/programmable read-only memories (EEPROMs) or UV-EPROMS, one-time programmable (OTP) memories, Flash memories, static RAM (SRAM), etc.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Also, some blocks in the flowcharts may be optionally omitted. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Where the phrases such as "at least one of A and B" or phrases of similar import are recited, such a phrase should be understood to mean "only A, only B, or both A and B." Reference to an element in the singular is not intended to mean "one and only one" unless explicitly so stated, but rather "one or more." Moreover, the terms "first," "second," and "third," etc. employed in reference to elements or features are used merely as labels, and are not intended to impose numerical requirements, sequential ordering or relative degree of significance or importance on their objects. All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A method of facilitating authentication between an external device (ED) and an implantable medical device (IMD) of a patient, the method comprising:
generating, a device authentication parameter;
decomposing, the device authentication parameter into a first key component and a second key component;
providing, the first key component to a cloud storage system;
embedding, the second key component into a therapy application that is executable on the external device, wherein the second key component is embedded into the therapy application via encoding in a non-descript string obfuscation; and
retrieving, the second key component from the therapy application, and the first key component from the cloud storage system, wherein the second key component is obtained via non-descript string de-obfuscation from the therapy application, and
generating, based on the retrieving, a reconstituted device authentication parameter from the first key component and the second key component and
authenticating the ED device by presenting the reconstituted device authentication parameter to the IMD.

2. The method as recited in claim 1, wherein the first key component comprises a random 128-bit value generated using OpenSSL.

3. The method as recited in claim 2, wherein the second key component comprises a value obtained by executing a reversible logic operation combining the random 128-bit value and a binary value of the device authentication parameter.

4. The method as recited in claim 3, wherein the reversible logic operation comprises a bitwise XOR operation between the random 128-bit value and the binary value.

5. The method as recited in claim 1, further comprising:
storing the reconstituted device authentication parameter in a device keychain; and
accessing the reconstituted device authentication parameter on at least one subsequent attempt to establish connection with the IMD.

6. The method as recited in claim 1, wherein the therapy application embedded with the second key component is distributed or otherwise obtained via at least one of a public app store, a private app store, a File Transfer Protocol (FTP) site, an enterprise device management system, a push mechanism or a pull mechanism.

7. The method as recited in claim 1, wherein the first key component is obtained from the cloud storage system responsive to an authenticated application programming interface (API) call over a Transport Layer Security (TLS) session.

8. The method as recited in claim 1, further comprising:
launching the therapy application and obtaining the second key component.

9. The method as recited in claim 1, further comprising configuring the ED one of a clinician programmer device, a patient controller device, or a delegated agent device.

10. The method as recited in claim 1, further comprising mutually authenticating between the therapy application of the external device and the IMD based on a pair of challenge-response sequences, each further based on exchanging respective public key infrastructure (PKI) credentials relating to the therapy application and the IMD.

11. A method of using an external device (ED) operative to communicate with an implantable medical device (IMD) of a patient, the method comprising:
establishing, using communication circuitry of the external device, a wireless telemetry communication link with the IMD;
obtaining, at a therapy application stored in a persistent memory module of the external device, a first key component from a cloud storage system;
obtaining a second key component embedded in the therapy application, wherein the obtaining comprises non-descript string de-obfuscation of data stored in the therapy application;
generating a reconstituted device authentication parameter from the first and second key components to be presented to the IMD for authentication;
storing the reconstituted device authentication parameter in a device keychain; and
establishing a connection with the IMD based on the reconstituted device authentication parameter stored in the device keychain.

12. The method as recited in claim 11, wherein the first key component comprises a random 128-bit value generated using OpenSSL.

13. The method as recited in claim 12, wherein the second key component comprises a value obtained by executing a reversible logic operation combining the random 128-bit value and a binary value.

14. The method as recited in claim 13, wherein the reversible logic operation comprises a bitwise XOR operation between the random 128-bit value and the binary value.

15. The method as recited in claim 11, wherein the persistent memory module includes program instructions for facilitating obtaining the therapy application including the embedded second key component via at least one of a public app store, a private app store, a File Transfer Protocol (FTP) site, an enterprise device management system, a push mechanism and/or a pull mechanism.

16. The method as recited in claim 11, wherein the persistent memory module includes program instructions for facilitating obtaining the first key component from the cloud storage system responsive to initiating an authenticated application programming interface (API) call over a Transport Layer Security (TLS) session.

17. The method as recited in claim 11, wherein the therapy application further includes program instructions for performing:
storing the reconstituted device authentication parameter in a device keychain; and
accessing the reconstituted device authentication parameter on an attempt to establish connection with the IMD.

18. The method as recited in claim 11, wherein the therapy application is configured with a privilege level for operating the external device as one of a clinician programmer device, a patient controller device, or a delegated agent device.

19. A method of facilitating authentication between an external device (ED) and an implantable medical device (IMD) of a patient, the method comprising:
generating a device authentication parameter having a key strength;

decomposing the device authentication parameter into a first key component and a second key component, the second key component comprises a value obtained by executing a reversible logic operation combining a random value and a binary value of the device authentication parameter;

providing the first key component to a cloud storage system;

embedding the second key component into a therapy application executable on the ED;

responsive to obtaining the first key component from the cloud storage system, retrieving from the therapy application the second key component via non-descript string de-obfuscation, and generating a reconstituted device authentication parameter from the first key component and the second key components; and authenticating the ED device by presenting the reconstituted device authentication parameter to the IMD.

* * * * *